US008052524B2

(12) United States Patent
Kato et al.

(10) Patent No.: US 8,052,524 B2

(45) Date of Patent: Nov. 8, 2011

(54) GAMING SYSTEM HAVING A PLURALITY OF GAMING MACHINES LINKED BY NETWORK AND CONTROL METHOD THEREOF

(75) Inventors: Yoichi Kato, Tokyo (JP); Arata Ajiro, Tokyo (JP); Kenta Sugano, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 665 days.

(21) Appl. No.: 12/209,470

(22) Filed: Sep. 12, 2008

(65) Prior Publication Data

US 2009/0270160 A1 Oct. 29, 2009

Related U.S. Application Data

(60) Provisional application No. 61/047,240, filed on Apr. 23, 2008.

(51) Int. Cl.
*A63F 13/10* (2006.01)
*A63F 13/12* (2006.01)

(52) U.S. Cl. ................................ 463/27; 463/20; 463/42

(58) Field of Classification Search ..................... 463/27
See application file for complete search history.

(56) References Cited

U.S. PATENT DOCUMENTS 6,068,553 A 5/2000 Parker
6,210,275 B1 4/2001 Olsen
6,224,484 B1 5/2001 Okuda et al.
2003/0236110 A1 12/2003 Beaulieu et al.
2005/0079911 A1 4/2005 Nakatsu
2005/0119044 A1 6/2005 Lim et al.
2005/0187014 A1 8/2005 Saffari et al.
2006/0073897 A1 4/2006 Englman et al.
2006/0116201 A1* 6/2006 Gauselmann .................. 463/26
2006/0148567 A1* 7/2006 Kellerman et al. ............ 463/42
2006/0205468 A1 9/2006 Saffari et al.
2006/0287043 A1 12/2006 Englman et al.
2007/0087824 A1 4/2007 Ogiwara
2007/0167217 A1 7/2007 Kaminkow et al.

* cited by examiner

*Primary Examiner* — Dmitry Suhol
*Assistant Examiner* — Carl V Larsen
(74) *Attorney, Agent, or Firm* — NDQ&M Watchstone LLP

(57) ABSTRACT

A gaming system of the present invention comprises: a plurality of gaming machines; and a control device including a memory device and a processor; wherein the memory device is capable of storing a plurality of types of winning-machine determination programs for determining the gaming machine to which payout of a game medium is conducted, out of the plurality of gaming machines, the winning-machine determination programs respectively determining the gaming machine by methods different from each other, and the processor is programmed to execute processing of determining the gaming machine to which the payout of the game medium is conducted, by executing the winning-machine determination program of the type specified based on the counted number of the gaming machines joining the game and paying out a predetermined number of game media to the determined gaming machine.

4 Claims, 17 Drawing Sheets

Fig.7

| Normal symbol | Number of rearranged symbols | | | |
|---|---|---|---|---|
| | 3 symbols | 4 symbols | 5 symbols | 6 or more symbols |
| RIBBON | 2 | 4 | 6 | m × (n−2) (※) |
| HEART | 3 | 6 | 9 | |
| STAR | 5 | 10 | 15 | |
| MOON | 8 | 16 | 24 | |
| SUN | 10 | 20 | 30 | |
| JEWEL | 15 | 30 | 45 | |
| CROWN | 20 | 40 | 60 | |
| SMILE | 30 | 60 | 90 | |

※"m" represents the amount of payout when 3 symbols are rearranged.
"n" represents the number of rearranged symbols.

Fig. 14A

| List of payout when number of bet is 1 | |
|---|---|
| Combination of symbols | Number of payouts |
| 3bar-3bar-3bar | 60 |
| 2bar-2bar-2bar | 40 |
| 1bar-1bar-1bar | 20 |
| anybar-anybar-anybar | 10 |

Fig. 14B

| List of payout when number of bet is 2 | |
|---|---|
| Combination of symbols | Number of payouts |
| 3bar-3bar-3bar | 120 |
| 2bar-2bar-2bar | 80 |
| 1bar-1bar-1bar | 40 |
| anybar-anybar-anybar | 20 |

Fig. 14C

| List of payout when number of bet is 3 | |
|---|---|
| Combination of symbols | Number of payouts |
| blue7-blue7-blue7 | 1800 |
| red7-red7-red7 | 100 |
| white7-white7-white7 | 100 |

GAMING SYSTEM HAVING A PLURALITY OF GAMING MACHINES LINKED BY NETWORK AND CONTROL METHOD THEREOF

CROSS-REFERENCE TO RELATED APPLICATIONS

This application claims benefit of priority based on U.S. Provisional Patent Application No. 61/047,240 filed on Apr. 23, 2008. The contents of this application are incorporated herein by reference in their entirety.

BACKGROUND OF THE INVENTION

1. Field of the Invention

The present invention relates to a gaming system having a plurality of gaming machines linked by a network and a control method thereof.

2. Discussion of the Background

Conventionally, there exists a gaming system having a plurality of gaming machines linked by network as disclosed in: U.S. Pat. Nos. 6,068,553, 6,210,275, 6,224,484 , US 2003/0236110-A1, US 2005/0079911-A1, US 2005/0119044-A1, US 2006/0205468-A1, US 2005/0187014-A1, US 2006/0287043-A1, US 2006/0073897-A1, US 2007/0087824-A1, US 2007/0167217-A1. In this kind of a gaming system, a game medium inserted into each gaming machine is pooled in one place and the pooled game media are paid out to the gaming machine having won a progressive jackpot.

A player playing a game in the aforementioned gaming system is playing the game for the sake of acquiring pooled game media. However, gaming systems as described above are monotonous, since payout of pooled game media is conducted to a gaming machine, for example, determined through a lottery, and the method itself for paying out the pooled game media lacks an interesting aspect. Therefore, there has been a problem that the player easily gets tired of the game.

The present invention was made in view of the aforementioned problem and an object thereof is to provide a gaming system that the player hardly gets tired of the game and a control method thereof.

The contents of U.S. Pat. Nos. 6,068,553, 6,210,275, 6,224,484, US 2003/0236110-A1, US 2005/0079911-A1, US 2005/0119044-A1, US 2006/0205468-A1, US 2005/0187014-A1, US 2006/0287043-A1, US 2006/0073897-A1, US 2007/0087824-A1, US 2007/0167217-A1 are incorporated herein by reference in their entirety.

SUMMARY OF THE INVENTION

The present invention provides a gaming system having the following configuration.

Namely, the gaming system comprises: a plurality of gaming machines each including a controller; a control device including a memory device and a processor; a network enabling communication between the plurality of gaming machines and the control device. Further, the memory device is capable of storing a plurality of types of winning-machine determination programs for determining the gaming machine to which payout of a game medium is conducted, out of the plurality of gaming machines, the winning-machine determination programs respectively determining the gaming machine by methods different from each other. Furthermore, the controller is programmed to execute processing of (a) accepting a bet of a game medium, and (b) transmitting number-of-game-media information indicative of a number of betted game media as the bet accepted in the processing (a) to the control device. Moreover, the processor is programmed to execute processing of (A) cumulatively counting a part of the number of betted game media as a cumulative value based on the number-of-game-media information received from the gaming machine, and (B) counting a number of the gaming machines joining the game among the gaming machines connected by the network, when the cumulative value has reached a predetermined value, (C) determining the gaming machine to which the payout of the game medium is conducted, by reading the winning-machine determination program of the type specified based on the number of the gaming machines counted in the processing (B) from the memory device and executing the winning-machine determination program, and (D) paying out a predetermined number of game media to the gaming machine determined in the processing (C).

According to the gaming system, the gaming machine to which the payout of the game medium is conducted is determined by an execution of the winning-machine determination program of the type specified based on the number of the gaming machines joining the game. Namely, a method for determining the gaming machine as a target of the payout of the game medium (hereinafter, also referred to as a winning machine) may be different in accordance with the number of players joining the game. Accordingly, it is possible to have the player interested in the determination method. Further, it is also possible to have the player always become conscious of the number of players joining the game at the present. Consequently, it is possible to provide a game that the player hardly gets tired.

It is desirable that the gaming system further has the following configuration.

Namely, the plurality of types of the winning-machine determination program includes a special winning-machine determination program for determining the gaming machine to which the payout of the game medium is conducted, based on the number-of-game-media information. Further, the processing (C) includes processing of determining the gaming machine to which the payout of the game medium is conducted, based on the number-of-game-media information transmitted in the processing (b), by reading the special winning-machine determination program from the memory device and executing the special winning-machine determination program, when the number of gaming machines counted in the processing (B) satisfies a predetermined condition.

According to the gaming system, the winning machine is determined based on the number of betted game media (e.g. a total number of betted game media, a balance of game media, and the like), when the number of gaming machines joining the game satisfies a predetermined condition. Accordingly, there may be a case where the method for determining the winning machine based on the total number of betted game media is advantageous for a player while the method for determining the winning machine based on the balance of the game media is disadvantageous for the player. Further, an opposite case may also be generated. Accordingly, it is possible to have the player always conscious of the present number of participants so as to know if the present number is advantageous or disadvantageous for the player in the relation with a situation of the game. As a result, it is possible to have the player absorbed in the game.

It is desirable that the gaming system further has the following configuration.

Namely, the special winning-machine determination program includes a particular program for determining the gaming machine as a transmission source of the number-of-game-media information having triggered the cumulative value to reach the predetermined value in the count as the gaming machine to which the payout of the game medium is conducted. Further, the processing (C) includes processing of determining the gaming machine as a transmission source of the number-of-game-media information having triggered the cumulative value to reach the predetermined value in the count among the counts in the processing (A), by reading the particular program from the memory device and executing the particular program, when the number of the gaming machines counted in the processing (B) satisfies a specific condition.

According to the gaming system, the gaming machine in which the bet triggering the cumulative value to reach the predetermined value has been betted is determined as the winning machine, when the number of the gaming machines joining the game satisfies the specific condition. Accordingly, it is possible to cause the player to have a sense of expectation for the cumulative value reaching the predetermined value every time he or she places a bet, especially in a case where the cumulative value is approaching the predetermined value. Consequently, it becomes possible to cause the player to have a stronger enthusiasm for each bet, thereby having the player absorbed in the game. Further, it is possible to give a great joy to the player in a case where the bet placed by the player causes the cumulative value to reach the predetermined value.

The present invention further provides a game control method having the following configuration.

Namely, a game control method comprises: (a) accepting a bet of a game medium in a gaming machine, (b) transmitting number-of-game-media information indicative of a number of betted game media as the bet accepted in the step (a) to a control device from the gaming machine, (A) cumulatively counting in the control device a part of the number of betted game media as a cumulative value based on the number-of-game-media information received from the gaming machine, and (B) counting in the control device a number of the gaming machines joining the game among the gaming machines connected by a network enabling communication between a plurality of the gaming machines and the control device, when the cumulative value has reached a predetermined value, (C) determining in the control device the gaming machine to which payout of the game medium is conducted, by reading a winning-machine determination program of a type specified based on the number of the gaming machines counted in the step (B) out of a plurality of types of the winning-machine determination programs for determining the gaming machines by methods different from each other, to which the payout of the game medium is conducted, out of the plurality of the gaming machines from the memory device and executing the winning-machine determination program, and (D) paying out a predetermined number of game media to the gaming machine determined in the step (C).

According to the game control method, the gaming machine to which the payout of the game medium is conducted is determined by an execution of the winning-machine determination program of the type specified based on the number of the gaming machines joining the game. Namely, a method for determining the gaming machine as a target of the payout of the game medium (hereinafter, also referred to as a winning machine) may be different in accordance with the number of players joining the game. Accordingly, it is possible to have the player interested in the determination method. Further, it is also possible to have the player always become conscious of the number of players joining the game at the present. Consequently, it is possible to provide a game that the player hardly gets tired.

BRIEF DESCRIPTION OF THE DRAWINGS

FIG. 7 is a view illustrating correspondence relationship among a type and a number of rearranged normal symbols and an amount of payouts.

FIG. 14A is a view illustrating a relationship between a combination of symbols rearranged on a winning line and a number of coin-outs according to another embodiment.

FIG. 14B is a view illustrating a relationship between a combination of symbols rearranged on a winning line and a number of coin-outs according to another embodiment.

FIG. 14C is a view illustrating a relationship between a combination of symbols rearranged on a winning line and a number of coin-outs according to another embodiment.

DESCRIPTION OF THE EMBODIMENTS

An embodiment of the present invention is described based on the drawings.

At first, with reference to FIG. 1 and FIG. 2, there will be given a general description of the present embodiment.

Figure 1:
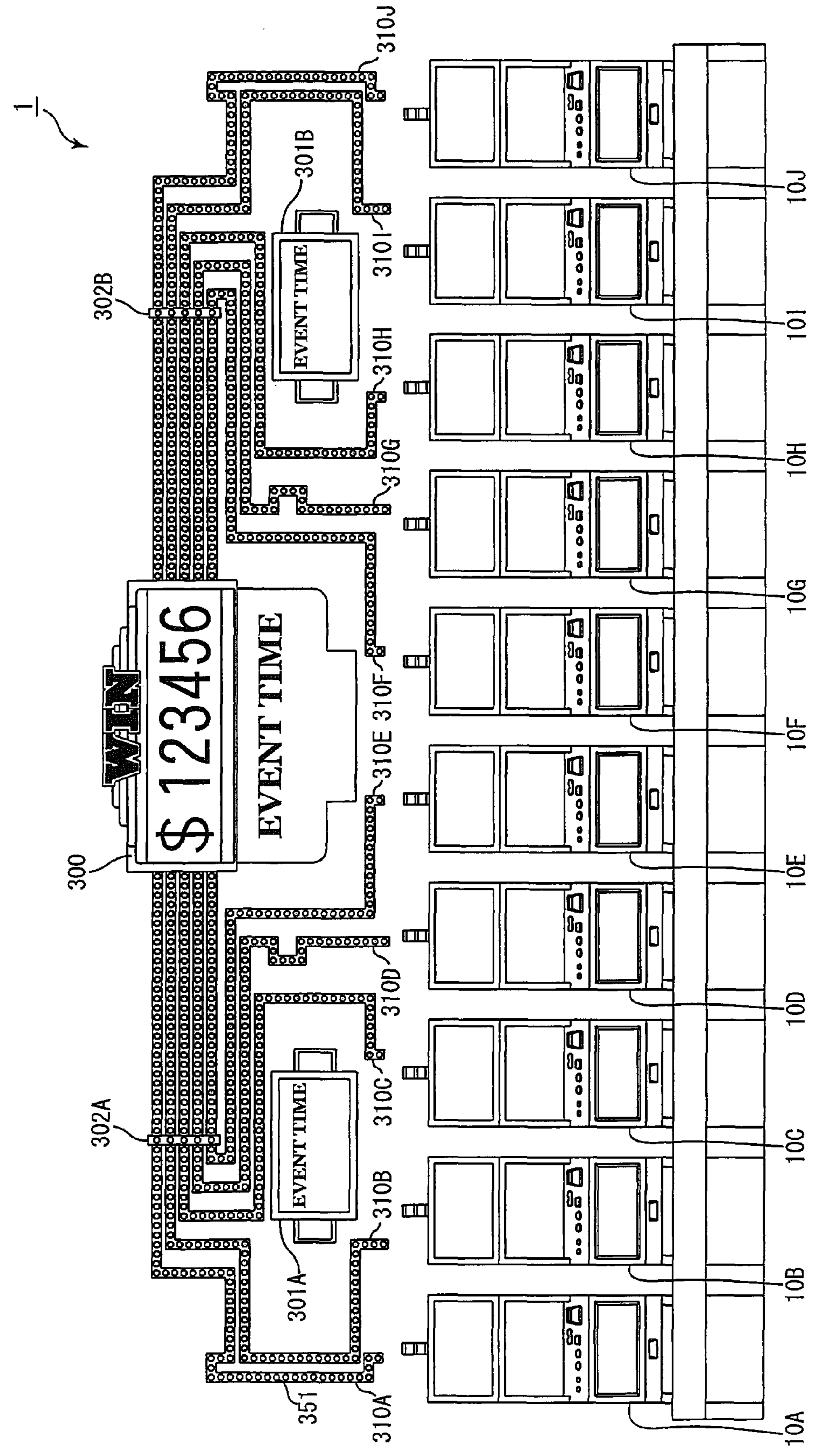
FIG. 1 is a front view schematically illustrating a gaming system according to one embodiment of a present invention.

FIG. 1 is a front view schematically illustrating a gaming system according to an embodiment of the present invention.

Figure 2:
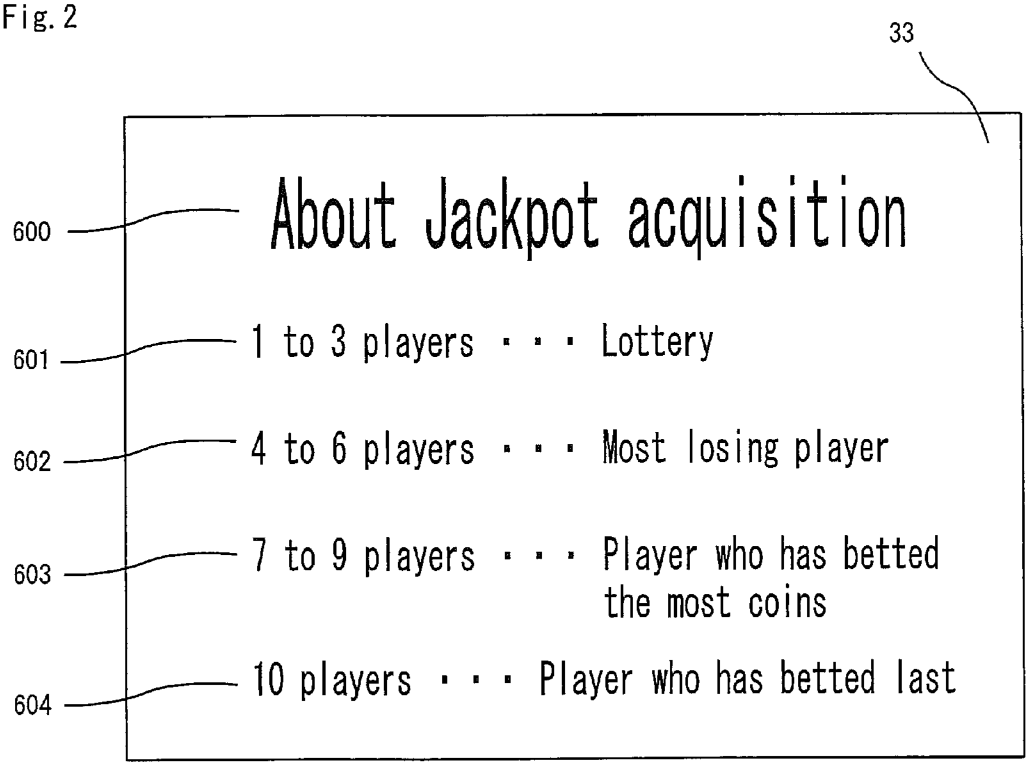
FIG. 2 is a view illustrating an exemplary image displayed to an upper image display panel included in a slot machine forming a gaming system according to one embodiment of the present invention.

FIG. 2 is a view illustrating an exemplary image displayed to an upper image display panel included in a slot machine forming a gaming system according to an embodiment of the present invention.

As illustrated in FIG. 1, a gaming system 1 includes a plurality of slot machines 10 (a slot machine 10A, a slot machine 10B, a slot machine 10C,a slot machine 10D, a slot machine 10E, a slot machine 10F, a slot machine 10G, a slot machine 10H, a slot machine 10I, and a slot machine 10J), a control device 200 (see FIG. 5), a common large display 300, and a plurality of common compact displays 301 (a common compact display 301A and a common compact display 301B), which are interconnected through a network.

Further, for the respective slot machines 10, there are provided coupling illuminated lines 310 (a coupling illuminated line 310A, a coupling illuminated line 310B, a coupling illuminated line 310C, a coupling illuminated line 310D, a coupling illuminated line 310E, a coupling illuminated line 310F, a coupling illuminated line 310G, a coupling illuminated line 310H, a coupling illuminated line 310I, and a coupling illuminated line 310J) which include a plurality of LEDs 351 arranged from the common large display 300 to the respective slot machines 10. The coupling illuminated lines 310 are each formed by a straight portion extending from the common large display 300 to one of boundary plates 302 (a boundary plate 302A and a boundary plate 302B), and a bent portion extending from one of the boundary plates 302 to the slot machine 10.

The slot machines 10 correspond to the gaming machines of the present invention.

Here, in the present embodiment, the same number of LEDs 351 are included in two coupling illuminated lines listed in each of the following groups (I) to (V):

(I) the coupling illuminated line 310A and the coupling illuminated line 310J;

(II) the coupling illuminated line 310B and the coupling illuminated line 310I;

(III) the coupling illuminated line 310C and the coupling illuminated line 310H;

(IV) the coupling illuminated line 310D and the coupling illuminated line 310G; and (V) the coupling illuminated line 310E and the coupling illuminated line 310F.

However, the numbers of LEDs 351 included in the coupling illuminated line listed in the respective groups (I) to (V) are different from each other.

This difference is caused by the difference in the numbers of LEDs 351 in the bent portions.

The numbers of LEDs 351 in the straight portions are same in all the coupling illuminated lines 310.

Further, FIG. 1 merely illustrates the gaming system according to the present embodiment schematically, and the number of LEDs 351 illustrated in FIG. 1 is not related to the number of LEDs 351 according to the present embodiment.

In the gaming system 1 according to the present embodiment, a part of coins betted in each slot machine 10 are cumulatively counted as a cumulative value. Further, an image indicative of the counted cumulative value is displayed to the common large display 300. In FIG. 1, "123456" is displayed to the common large display 300, indicating that the cumulative value is 123456. When the cumulative value reaches a predetermined value, a payout of coins is conducted as a jackpot to any of the slot machines 10.

With reference to FIG. 2, there is described a determination method of the slot machine 10 to which the payout of coins relating to the jackpot is conducted.

As illustrated in FIG. 2, text images indicative of precautions for an acquisition of the jackpot are displayed to an upper image display panel 33.

A text image 601 indicates that the slot machine, to which the payout of coins relating to the jackpot is conducted, is determined by lottery when the number of the slot machines 10 joining the game is in the range of one to three.

A text image 602 indicates that the payout of coins relating to the jackpot is conducted to the slot machine 10 with the balance of the game media being the most negative value when the number of the slot machines 10 joining the game is in the range of four to six.

A text image 603 indicates that the payout of coins relating to the jackpot is conducted to the slot machine 10 with the total number of the betted coins (the accumulated number of bets) being the largest when the number of the slot machines 10 joining the game is in the range of seven to nine.

A text image 604 indicates that the payout of coins relating to the jackpot is conducted to the slot machine 10 in which the bet triggering the cumulative value to reach the predetermined value has been betted when the number of the slot machines 10 joining the game is 10.

As above, in the present embodiment, the determination method of the slot machine 10 to which the payout of coins relating to the jackpot is conducted is different in accordance with the number of the slot machines 10 joining the game.

As above, there has been given the general description of the present embodiment, with reference to FIG. 1 and FIGS. 2A to 2B.

Hereinafter, the present embodiment is described in more detail.

Next, a configuration of the slot machine 10 is described.

Figure 3:
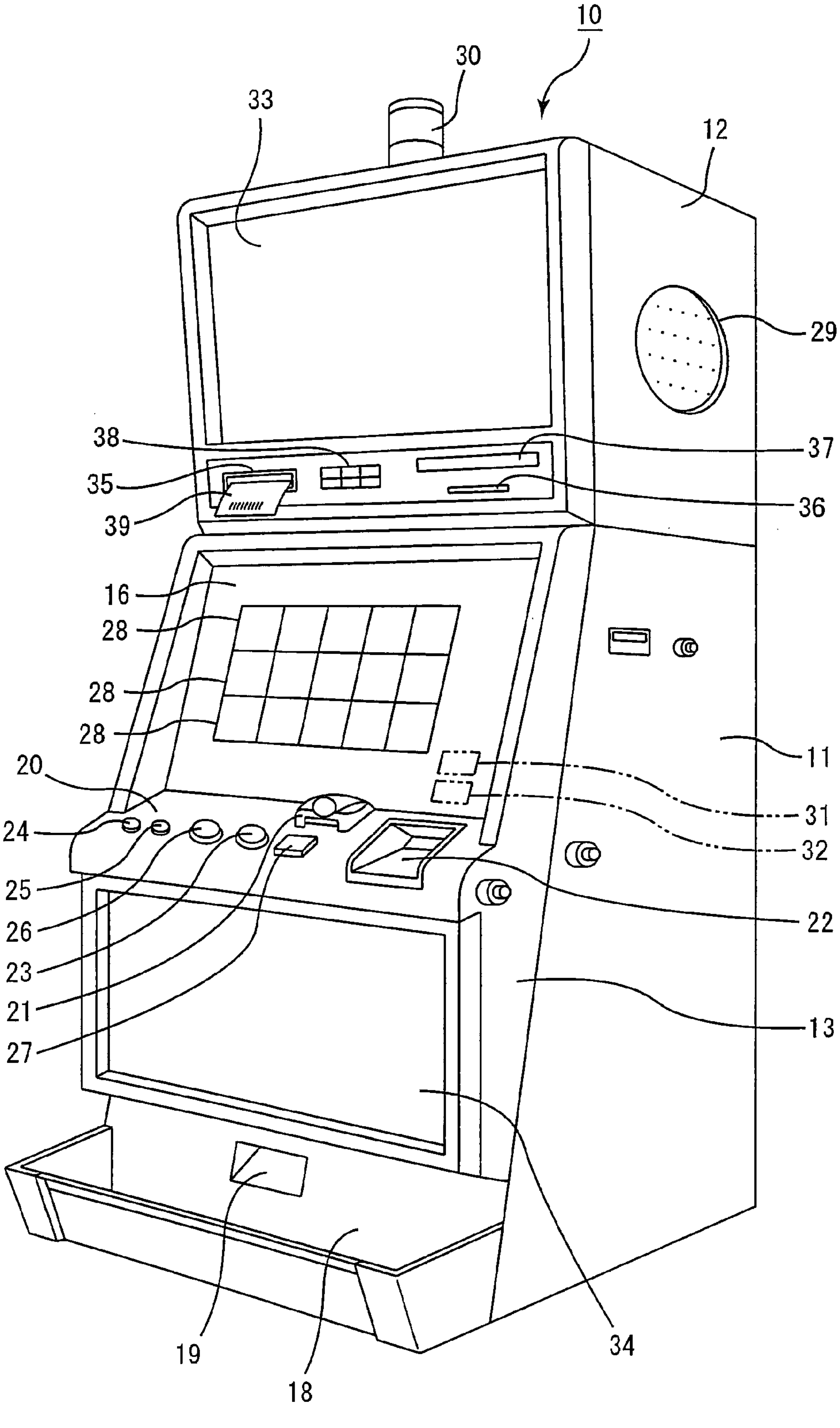
FIG. 3 is a perspective view illustrating an external view of a slot machine forming a gaming system according to a present embodiment.

FIG. 3 is a perspective view illustrating an external view of a slot machine forming a gaming system according to the present embodiment.

In the slot machine 10, a coin, a bill, or electronic valuable information corresponding to those is used as a game medium. However, in the present invention, the game medium is not particularly limited. Examples of the game medium may include a medal, a token, electronic money and a ticket. It is to be noted that the ticket is not particularly limited, and examples thereof may include a ticket with a barcode as described later.

The slot machine 10 comprises a cabinet 11, a top box 12 installed on the upper side of the cabinet 11, and a main door 13 provided at the front face of the cabinet 11.

On the main door 13, there is provided a lower image display panel 16 as a display. The lower image display panel 16 includes a transparent liquid crystal panel which displays fifteen display blocks 28 along five columns and three rows. A single symbol is displayed in each display block 28. Further, although not illustrated, various types of images relating to an effect, as well as the aforementioned images, are displayed to the lower image display panel 16.

Further, a number-of-credits display portion 31 and a number-of-payouts display portion 32 are provided on the lower image display panel 16. The number-of-credits display portion 31 displays an image indicative of the number of credited coins. The number-of-payouts display portion 32 displays an image indicative of the number of coins to be paid out.

Moreover, although not shown, a touch panel 69 is provided at the front face of the lower image display panel 16. The player can operate the touch panel 69 to input a variety of commands.

Below the lower image display panel 16, there are provided a control panel 20 including a plurality of buttons 23 to 27 with each of which a command according to game progress is inputted by the player, a coin receiving slot 21 through which a coin is accepted into the cabinet 11, and a bill validator 22.

The control panel 20 is provided with a start button 23, a change button 24, a CASHOUT button 25, a 1-BET button 26 and a maximum BET button 27. The start button 23 is for inputting a command to start scrolling of symbols. The change button 24 is used for making a request of staff in the recreation facility for exchange. The CASHOUT button 25 is used for inputting a command to pay out credited coins to a coin tray 18.

The 1-BET button 26 is used for inputting a command to bet one coin on a game out of credited coins. The maximum BET button 27 is used for inputting a command to bet the maximum number of coins that can be bet on one game (50 coins in the present embodiment) out of credited coins.

The bill validator 22 not only discriminates a regular bill from a false bill, but also accepts the regular bill into the cabinet 11. It is to be noted that the bill validator 22 may be configured so as to be capable of reading a later-described ticket 39 with a barcode. At the lower front of the main door 13, namely, below the control panel 20, there is provided a belly glass 34 on which a character or the like of the slot machine 10 is drawn.

On the front surface of the top box 12, there is provided the upper image display panel 33. The upper image display panel 33 includes a liquid crystal panel, which displays, for example, images indicative of introductions of the contents of games and explanations about the rules of games as illustrated in FIG. 2.

Further, a speaker 29 is provided in the top box 12. Under the upper image display panel 33, there are provided a ticket printer 35, a card reader 36, a data display 37, and a key pad 38. The ticket printer 35 prints on a ticket a barcode as coded data of the number of credits, a date, an identification number of the slot machines 10, and the like, and outputs the ticket as the ticket 39 with a barcode. The player can make another slot machine read the ticket 39 with a barcode to play a game thereon, or exchange the ticket 39 with a barcode with a bill or the like at a predetermined place in the recreation facility (e.g. a cashier in a casino).

The card reader 36 reads data from a smart card and writes data into the smart card. The smart card is a card owned by the player, and for example, data for identifying the player and data concerning a history of games played by the player are stored therein. Data corresponding to a coin, a bill or a credit may be stored in the smart card. Further, a magnetic stripe card may be adopted in place of the smart card. The data display 37 includes a fluorescent display and the like, and displays, for example, data read by the card reader 36 or data inputted by the player via the key pad 38. The key pad 38 is used for inputting a command and data concerning issuing of a ticket, and the like.

Figure 4:
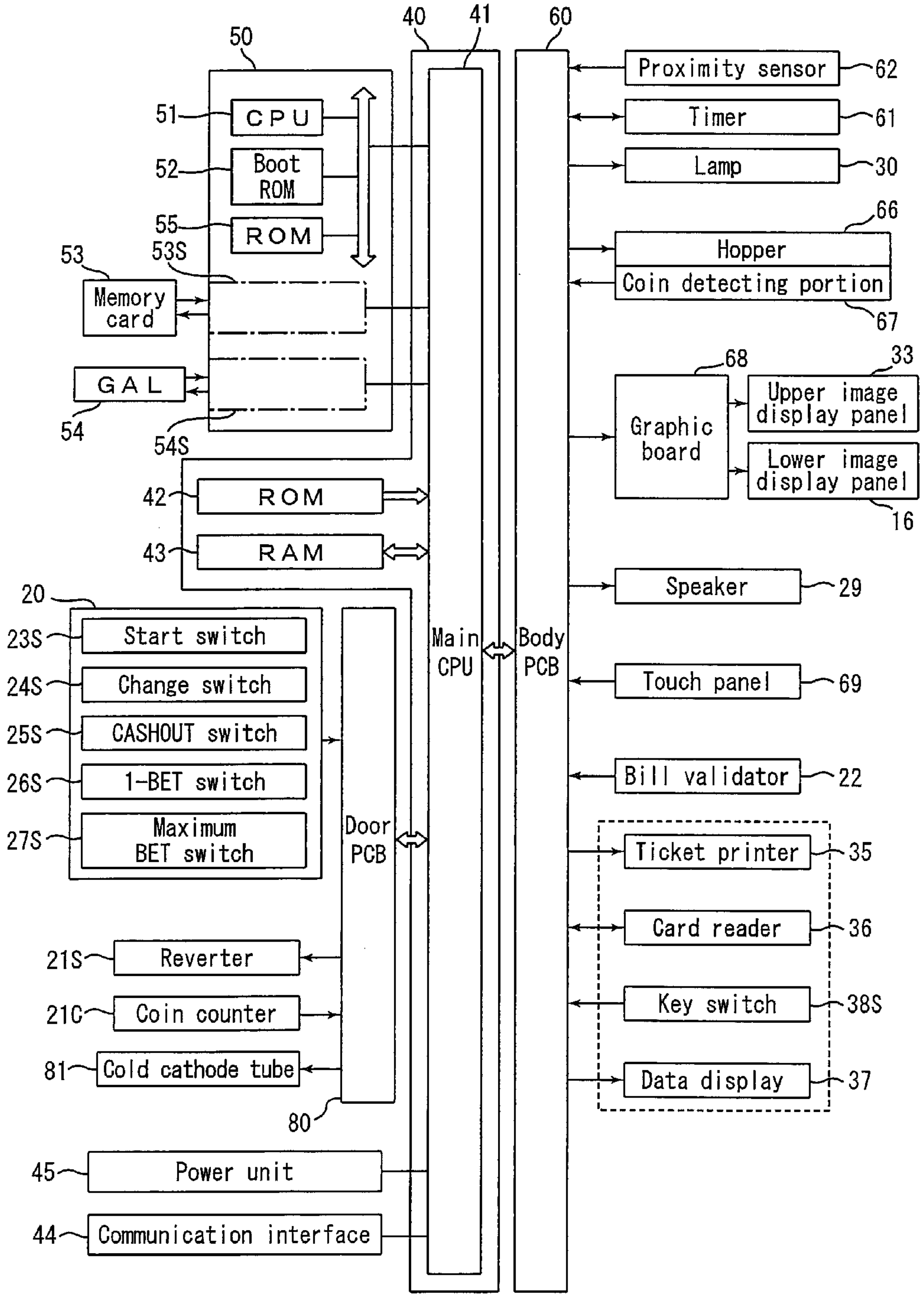
FIG. 4 is a block diagram illustrating an internal configuration of the slot machine shown in FIG. 3.

FIG. 4 is a block diagram showing an internal configuration of the slot machine shown in FIG. 3.

A gaming board 50 is provided with a CPU (Central Processing Unit) 51, a ROM 55, and a boot ROM 52 which are interconnected to one another by an internal bus, a card slot 53S corresponding to a memory card 53, and an IC socket 54S corresponding to a GAL (Generic Array Logic) 54.

The memory card 53 includes a nonvolatile memory such as CompactFlash (registered trade mark), and stores a game program. The game program includes a symbol determination program. The symbol determination program is a program for determining symbols to be rearranged in the display blocks 28.

Further, the game program includes odds data indicative of the correspondence relationship among the type and the number of rearranged symbols and the amount of payouts (see FIG. 7).

Further, the card slot 53S is configured so as to allow the memory card 53 to be inserted thereinto or removed therefrom, and is connected to the mother board 40 by an IDE bus. Therefore, the memory card 53 can be removed from the card slot 53S, and then another game program is written into the memory card 53, and the memory card 53 can be inserted into the card slot 53S, to change the type and contents of a game played on the slot machine 10. The game program includes a program according to progress of the game. Further, the game program includes image data and sound data to be outputted during the game.

The CPU 51, the ROM 55 and the boot ROM 52 interconnected to one another by an internal bus are connected to the mother board 40 through the PCI bus. The PCI bus not only conducts signal transmission between the mother board 40 and the gaming board 50, but also supplies power from the mother board 40 to the gaming board 50.

The mother board 40 is configured using a commercially available general-purpose mother board (a print wiring board on which fundamental components of a personal computer are mounted), and provided with a main CPU 41, a ROM (Read Only Memory) 42, a RAM (Random Access Memory) 43, and a communication interface 44. The mother board 40 corresponds to the controller of the present invention.

The ROM 42 comprises a memory device such as a flash memory, and stores a program such as a BIOS (Basic Input/Output System) executed by the main CPU 41 and permanent data. When the BIOS is executed by the main CPU 41, processing for initializing a predetermined peripheral device is conducted, concurrently with start of processing for loading the game program stored in the memory card 53 via the gaming board 50. It is to be noted that, in the present invention, the ROM 42 may or may not be data rewritable one.

The RAM 43 stores data and a program to be used at the time of operation of the main CPU 41. Further, the RAM 43 is capable of storing a game program.

Moreover, the RAM 43 stores data of the number of credits, the numbers of coin-ins and coin-outs in one game, and the like.

Moreover, the mother board 40 is connected with a later-described body PCB (Printed Circuit Board) 60 and a door PCB 80 through respective USBs. Further, the mother board 40 is connected with a power supply unit 45 and the communication interface 44.

The body PCB 60 and the door PCB 80 are connected with an equipment and a device that generate an input signal to be inputted into the main CPU 41 and an equipment and a device operations of which are controlled by a control signal outputted from the main CPU 41. The main CPU 41 executes the game program stored in the RAM 43 based on the input signal inputted into the main CPU 41, and thereby executes the predetermined arithmetic processing, stores the result thereof into the RAM 43, or transmits a control signal to each equipment and device as processing for controlling each equipment and device.

The body PCB 60 is connected with a lamp 30, a hopper 66, a coin detecting portion 67, a graphic board 68, the speaker 29, the touch panel 69, the bill validator 22, the ticket printer 35, the card reader 36, a key switch 38S and the data display 37. The lamp 30 is lighted in a predetermined pattern based on control signals outputted from the main CPU 41.

The hopper 66 is installed inside the cabinet 11, and pays out a predetermined number of coins based on the control signal outputted from the main CPU 41, from a coin payout exit 19 to the coin tray 18. The coin detecting portion 67 is provided inside the coin payout exit 19, and outputs an input signal to the main CPU 41 in the case of detecting payout of the predetermined number of coins from the coin payout exit 19.

A timer 61 is used for measuring the time.

A proximity sensor 62 is provided at the front face of the slot machine 10 (not illustrated). The proximity sensor 62 detects the presence of the player by emitting infrared rays and detecting a reflection of the emitted infrared rays. In the case of detecting the presence of the player, the proximity sensor 62 transmits a detection signal to the main CPU 41.

The graphic board 68 controls image display to the upper image display panel 33 and the lower image display panel 16 based on the control signal outputted from the main CPU 41. In the respective display blocks 28 on the lower image display panel 16, symbols are displayed in a scrolling manner or in a stopped state. The number of credits stored in the RAM 43 is displayed to the number-of-credits display portion 31 of the lower image display panel 16. Further, the number of coin-outs is displayed to the number-of-payouts display portion 32 of the lower image display panel 16.

The graphic board 68 comprises a VDP (Video Display Processor) for generating image data based on the control signal outputted from the main CPU 41, a video RAM for temporarily storing image data generated by the VDP, and the like. It is to be noted that image data used in generation of the image data by the VDP is included in the game program read from the memory card 53 and stored into the RAM 43.

The bill validator 22 not only discriminates a regular bill from a false bill, but also accepts the regular bill into the cabinet 11. Upon acceptance of the regular bill, the bill validator 22 outputs an input signal to the main CPU 41 based on a face amount of the bill. The main CPU 41 stores in the RAM 43 the number of credits corresponding to the face amount of the bill transmitted with the input signal.

The ticket printer 35, based on the control signal outputted from the main CPU 41, prints on a ticket a barcode as coded data of the number of credits stored in the RAM 43, a date, and an identification number of the slot machine 10, and the like, and outputs the ticket as the ticket 39 with a barcode. The card reader 36 reads data from the smart card and transmits the read data to the main CPU 41, and writes data onto the smart card based on the control signal from the main CPU 41. The key switch 38S is provided on the keypad 38, and outputs a predetermined input signal to the main CPU 41 when the key pad 38 is operated by the player. The data display 37 displays data read by the card reader 36 and data inputted by the player via the key pad 38, based on the control signal outputted from the main CPU 41.

The door PCB 80 is connected with the control panel 20, a reverter 21S, a coin counter 21C, and a cold cathode tube 81. The control panel 20 is provided with a start switch 23S corresponding to the start button 23, a change switch 24S corresponding to the change button 24, a CASHOUT switch 25S corresponding to the CASHOUT button 25, a 1-BET switch 26S corresponding to the 1-BET button 26, and a maximum BET switch 27S corresponding to the maximum BET button 27. Each of the switches 23S to 27S outputs an input signal to the main CPU 41 when each of the buttons 23 to 27 corresponding thereto is operated by the player.

The coin counter 21C is provided inside the coin receiving slot 21, and discriminates a regular coin from a false coin inserted into the coin receiving slot 21 by the player. Coins other than the regular coin are discharged from the coin payout exit 19. Further, the coin counter 21C outputs an input signal to the main CPU 41 in detection of the regular coin.

The reverter 21S operates based on the control signal outputted from the main CPU 41, and distributes a coin recognized by the coin counter 21C as the regular coin into a cash box (not shown) or the hopper 66, which are disposed in the slot machine 10. Namely, when the hopper 66 is filled with coins, the regular coin is distributed into the cash box by the reverter 21S. On the other hand, when the hopper 66 is not filled with coins, the regular coin is distributed into the hopper 66. The cold cathode tube 81 functions as a back light installed on the rear face side of the lower image display panel 16 and the upper image display panel 33, and lighted up based on the control signal outputted from the main CPU 41.

Figure 5:
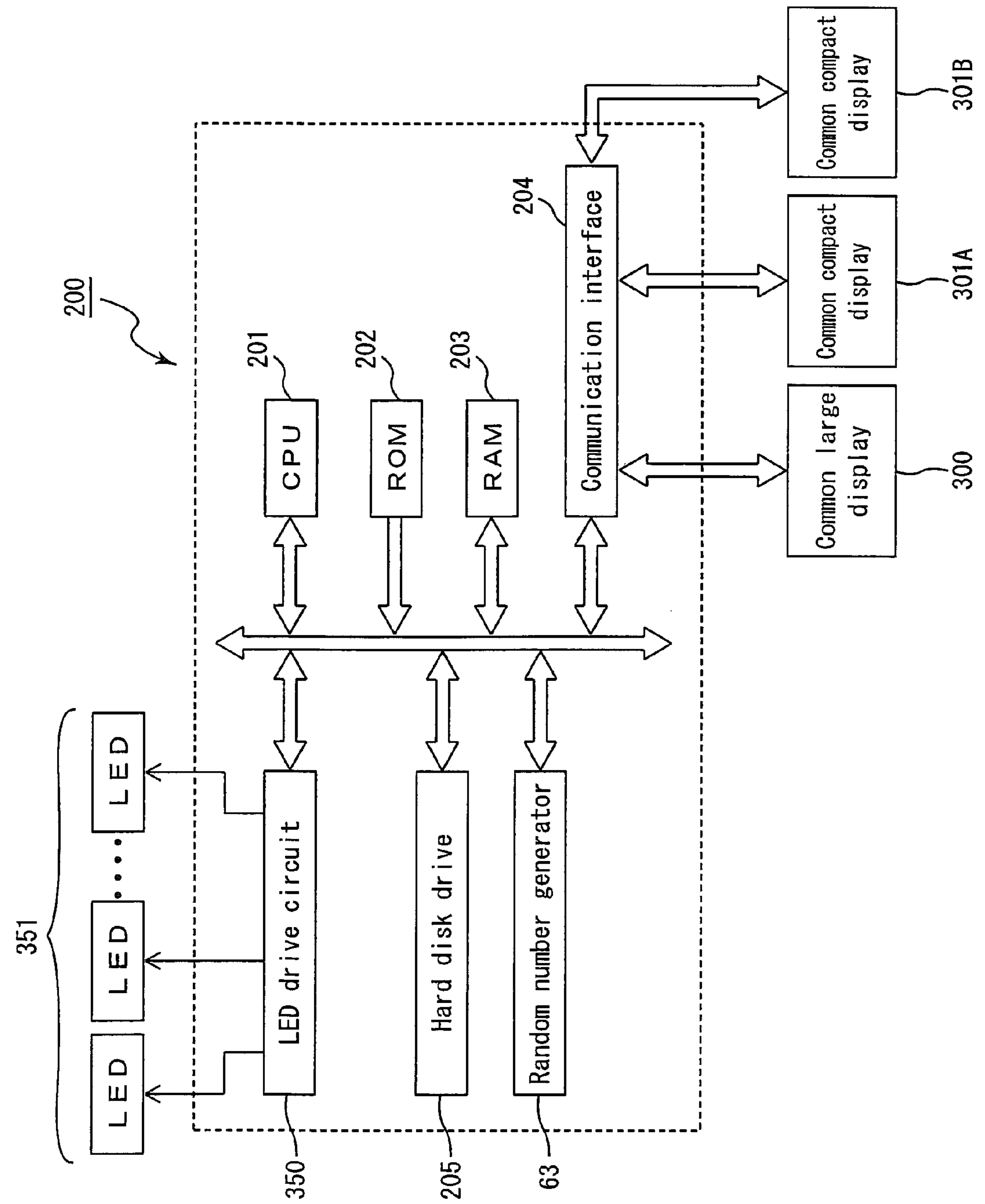
FIG. 5 is a block diagram illustrating an internal configuration of a control device forming the gaming system according to one embodiment of the present invention.

FIG. 5 is a block diagram illustrating an internal configuration of a control device forming the gaming system according to an embodiment of the present invention.

The control device 200 includes a CPU 201, a ROM 202, a RAM 203, a communication interface 204, a LED drive circuit 350, a random number generator 63, and a hard disk drive 205 as a memory. The random number generator 63 generates a random number at a predetermined timing. The communication interface 204 is connected, through communication lines 101, to the communication interfaces 44 in the respective slot machines 10 and also is connected to the common large display 300 and the common compact displays 301 through communication lines 102. The ROM 202 stores a system program for controlling the operation of a processor, permanent data, and the like.

Further, the RAM 203 temporarily stores data received from each slot machine 10.

The RAM 203 is provided with an accumulated-number-of-bets storage area, a balance storage area, a cumulative value storage area, and a number-of-lights storage area.

The accumulated-number-of-bets storage area stores the accumulated-number-of-bets data indicative of the accumulated number of bets in each slot machine 10, in association with the identification number of each slot machine 10.

The balance storage area stores balance data indicative of the balances of game media in the respective slot machines 10, in association with the identification numbers of the slot machines 10.

The cumulative-value storage area stores cumulative-value data indicative of the cumulative value.

The number-of-lights storage area stores number-of-lights data indicative of the numbers of LEDs 351 which have been lighted, out of the LEDs 351 included in the coupling illuminated lines 310 provided for the respective slot machines 10, in association with the identification numbers of the slot machines 10 provided with the corresponding coupling illuminated line 310.

The plurality of LEDs 351 are connected to the LED drive circuit 350. The LEDs 351 are associated with respective identification numbers, and the LED drive circuit 350 turns on and turns off the LEDs 351 based on a signal received from the CPU 201.

Next, there is described processing executed in the slot machines 10.

The main CPU 41 proceeds with a slot machine game by reading and executing the game program.

Figure 6:
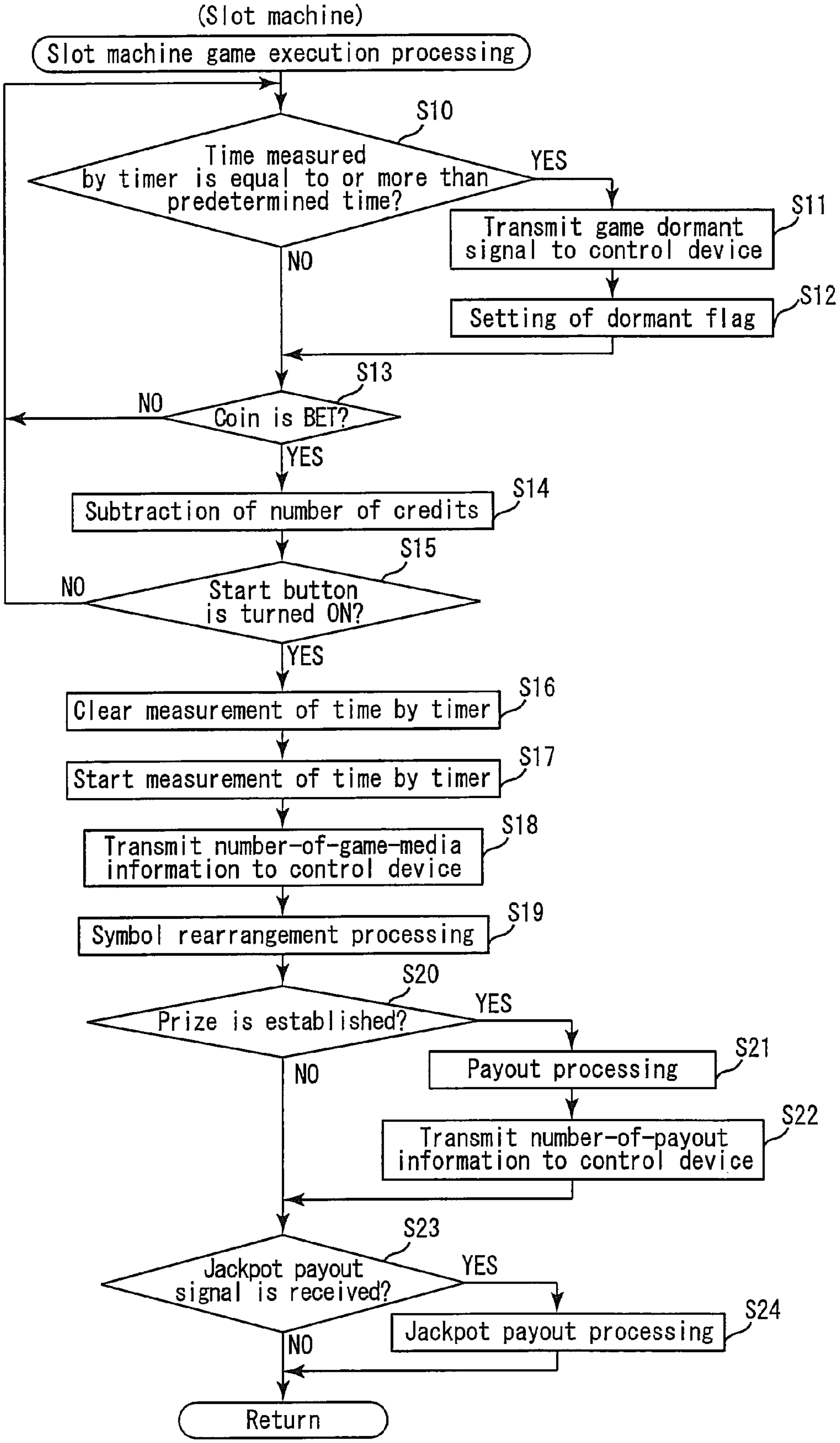
FIG. 6 is a flowchart illustrating slot-machine game execution processing executed in a slot machine 10.

FIG. 6 is a flowchart illustrating slot-machine game execution processing executed in the slot machines 10.

FIG. 7 is a view illustrating correspondence relationship among a type and a number of rearranged normal symbols and an amount of payouts.

At first, the main CPU 41 determines whether or not a common-game flag is set (step S200).

First, the main CPU 41 determines whether or not the time measured by the timer 61 is equal to or more than a predetermined time T (step S10).

When determining in step S10 that the time is not equal to or more than the predetermined time T, the main CPU 41 shifts the processing to step S13. On the other hand, when determining in step S10 that the time is equal to or more than the predetermined time T, the main CPU 41 transmits a game dormant signal to the control device 200 (step S11). The game dormant signal includes information indicative of the identification number of the slot machine 10. Further, the main CPU 41 sets a dormant flag (step S12).

The main CPU 41 determines whether or not a coin has been betted (step S13). In this processing, the main CPU 41 determines whether or not to have received an input signal that is outputted from the 1-BET switch 26S when the 1-BET button 26 is operated, or an input signal that is outputted from the maximum BET switch 27S when the maximum BET button 27 is operated. When the main CPU 41 determines that the coin has not been betted, the processing is returned to step S10.

On the other hand, when determining that the coin has been betted in step S13, the main CPU 41 conducts processing for making a subtraction from the number of credits stored in the RAM 43 according to the number of betted coins (step S14). It is to be noted that, when the number of coins to be betted is larger than the number of credits stored in the RAM 43, the main CPU 41 does not conduct the processing for making a subtraction from the number of credits stored in the RAM 43, and the processing is returned to step S10. Further, when the number of coins to be betted exceeds the upper limit of the number of coins that can be betted in one game (50 coins in the present embodiment), the main CPU 41 does not conduct the processing for making a subtraction from the number of credits stored in the RAM 43, and the processing is proceeded to step S15.

Next, the main CPU 41 determines whether or not the start button 23 has been turned ON (step S15). In this processing, the main CPU 41 determines whether or not to have received an input signal that is outputted from the start switch 23S when the start button 23 is pressed.

When the main CPU 41 determines that the start button 23 has not been turned on, the processing is returned to step S10.

It is to be noted that, when the start button 23 is not turned ON (e.g. when the start button 23 is not turned ON and a command to end the game is inputted), the main CPU 41 cancels a subtraction result in step S14.

On the other hand, when determining in step S15 that the start button 23 is turned ON, the main CPU 41 clears the time measured by the timer 61 (step S16) and start measurement of the time by the timer 61 (step S17).

The main CPU 41 transmits number-of-game-media information indicative of the number of the betted coins and information indicative of the identification number of the slot machine 10 to the control device 200 (step S18).

Next, the main CPU 41 executes symbol rearrangement processing (step S19).

In this processing, at first, the main CPU 41 starts scrolling-display of the symbols in the display blocks 28. Then, the main CPU 41 executes the aforementioned symbol determination program, so as to determine the symbols to be rearranged, and then rearranges the symbols in the display blocks 28.

Next, the main CPU 41 determines whether or not a prize has been established (step S20). Here, the establishment of a prize refers to a rearrangement of at least one combination of three or more symbols of the same type, out of "RIBBON", "HEART", "STAR", "MOON", "SUN", "JEWEL", "CROWN", and "SMILE", in the display blocks 28 (see FIG. 7). In this processing, the main CPU 41 counts the number of symbols for each type of the symbols rearranged in step S19. Then, the main CPU 41 determines whether or not the counted number is three or more.

When determining that a prize has been established, the main CPU 41 executes processing relating to the payout of coins (step S21). In the processing, the main CPU 41 determines the amount of payout based on the numbers of rearranged symbols with reference to the odds data stored in the RAM 43. The odds data is data indicative of the correspondence relationship between the number of symbols rearranged in the display blocks 28 and the amount of payouts (see FIG. 7).

For example, in the case that two coins have been betted, when three "SUNs" are rearranged, 20 (=2×10) coins are paid out.

In the case of accumulating coins, the main CPU 41 conducts processing for adding the number of credits corresponding to the determined amount of payout to the number of credits stored in the RAM 43. On the other hand, in the case of paying out coins, the main CPU 41 transmits a control signal to the hopper 66 in order to pay out coins in an amount corresponding to the determined amount of payout.

Then, the main CPU 41 transmits number-of-payouts information indicative of the determined amount of payout, that is, the number of paid out coins, and information indicative of the identification number of the slot machine 10 to the control device 200 (step S22).

When determining in step S20 that the prize has not been established, or after executing the processing of step S22, the main CPU 41 determined whether or not to have received a jackpot payout signal (step S23). The jackpot payout signal is a signal transmitted from the control device 200 to the slot machine 10 determined in winning-machine determination processing, triggered by the cumulative value having reached the predetermined value (see steps S107 to S110 in FIG. 8). The jackpot payout signal includes information indicative of the cumulative value.

When determining to have received the jackpot payout signal, the main CPU 41 executes jackpot payout processing (step S24). In this processing, the main CPU 41 pays out coins in number corresponding to the cumulative value based on the information indicative of the cumulative value which is included in the jackpot payout signal. The processing executed by the main CPU 41 in step S24 includes output of an annunciation sound from the speaker 29, lighting of the lamp 30, print of the ticket 39 with a barcode indicative of the number of coins to be paid out printed thereon, and the like.

When determining not to have received a jackpot payout signal in step S23 or after executing the processing of step S24, the main CPU 41 completes the present subroutine.

As above, there has been described the processing which is executed in the slot machines 10, with reference to FIGS. 6 to 7.

Subsequently, processing executed by the control device 200 is described, with reference to FIGS. 8 to 12.

Figure 8:
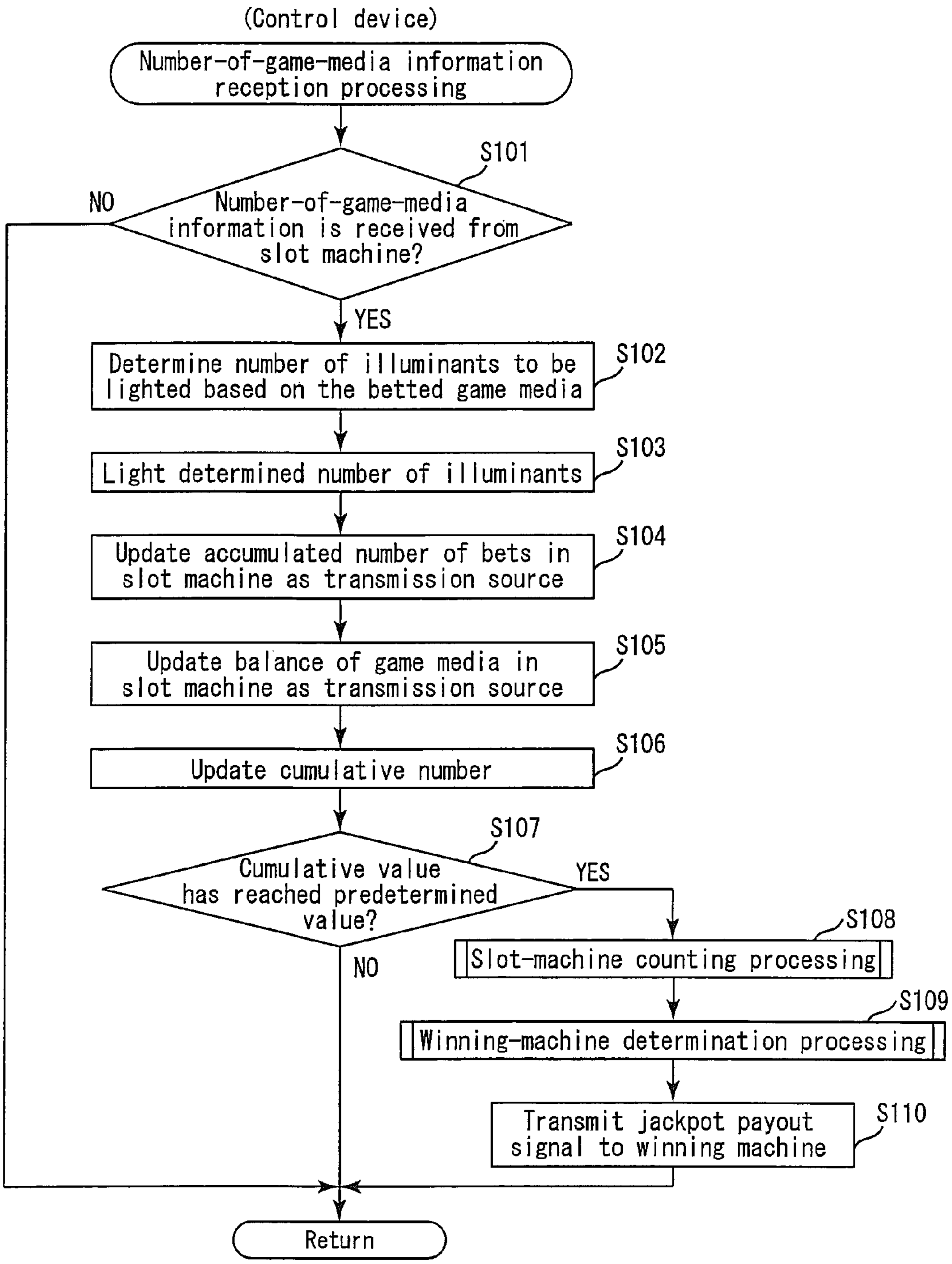
FIG. 8 is a flowchart illustrating a subroutine of number-of-game-media information reception processing.

FIG. 8 is a flowchart illustrating a subroutine of number-of-game-media information reception processing.

At first, the CPU 201 determines whether or not to have received the number-of-game-media information from the slot machine 10 at a predetermined timing (step S101). The number-of-game-media information is information indicative of the number of coins which have been betted in the slot machine 10 (see step S18 in FIG. 6). When determining not to have received the number-of-game-media information, the CPU 201 completes the present subroutine.

On the other hand, when determining to have received the number-of-game-media information, the CPU 201 determines a number N of the LEDs 351 to be lighted based on the number-of-game-media information (step S102). In the processing, the CPU 201 calculates the maximum integral number N satisfying N≦M×b/B ("b" being the number of coins indicative of the number-of-game-media information, "B" being the number of coins corresponding to the predetermined value, and "M" being the total number of the LEDs 351 provided in the coupling illuminated line 310) for each coupling illuminated line 310.

Next, the CPU 201 makes the LEDs 351 (illuminants) in number determined in step S102 be lighted (emit light) in the coupling illuminated line 310 provided for each slot machine 10 (step S103).

In this processing, the CPU 201 identifies the identification numbers of the LEDs 351 to be lighted, based on the number determined in step S102 and the number of lights indicated by the number-of-lights data stored in the number-of-lights storage area in the RAM 203 in association with the identification number of each slot machine 10. Further, the CPU 201 transmits to the LED drive circuit 350 a signal including information indicative of the identified identification numbers. On receiving this signal, the LED drive circuit 350 lights the LEDs 351 associated with the identification numbers included in the signal.

Further, after transmitting the signal, the CPU 201 adds the number determined in step S102 to the number of lights indicated by the number-of-lights data stored in the number-of-lights storage area in the RAM 203 in association with the identification number of each slot machine 10.

Next, based on the number-of-game-media information received in step S101, the CPU 201 updates the accumulated-number-of-bets data indicative of the accumulated number of bets in the slot machine 10 as a transmission source of the number-of-game-media information in the accumulated-number-of-bets storage area in the RAM 203 (step S104).

Next, based on the number-of-game-media information received in step S101, the CPU 201 updates the balance data indicative of the balance of the game media in the slot machine 10 as a transmission source of the number-of-game-media information in the balance storage area in the RAM 203 (step S105).

Figure 9:
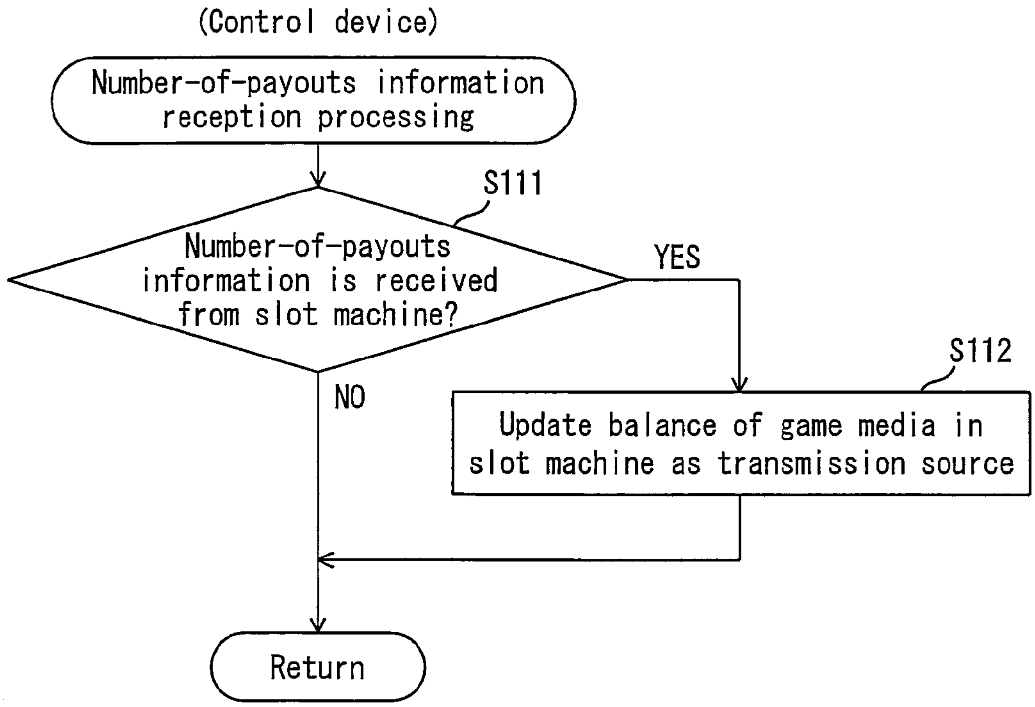
FIG. 9 is a flowchart illustrating a subroutine of number-of-payouts information reception processing.

The update of the balance data is also conducted in the number-of-payouts information reception processing in FIG. 9.

FIG. 9 is a flowchart illustrating a subroutine of number-of-payouts information reception processing.

First, the CPU 201 determines whether or not to have received the number-of-payouts information (see step S22 in FIG. 6) from the slot machine 10 at a predetermined timing (step S111).

When determining to have received the number-of-payouts information, the CPU 201 updates the balance data indicative of the balance of the game media in the slot machine 10 as a transmission source of the number-of-payouts information in the balance storage area in the RAM 203 based on the number-of-payouts information (step S112).

When determining in step S111 not to have received the number-of-payouts information, or after executing the processing of step S112, the CPU 201 completes the present subroutine.

After executing the processing of step S105 in FIG. 8, the CPU 201 updates the cumulative-value data indicative of the cumulative value in the cumulative-value storage area in the RAM 203 (step S106). In the processing, the CPU 201 adds the value corresponding to a part (10% in the present embodiment) of the number of game media indicated by the number-of-game-media information received in step S101 to the cumulative value indicated by the cumulative-value data stored in the cumulative-value storage area in the RAM 203.

Next, the CPU 201 determines whether or not the cumulative value has reached the predetermined value based on the cumulative-value data stored in the RAM 203 (step S107).

When determining that the cumulative value has reached the predetermined value, the CPU 201 executes slot-machine counting processing (step S108).

Here, the slot-machine counting processing is described with reference to FIG. 10.

Figure 10:
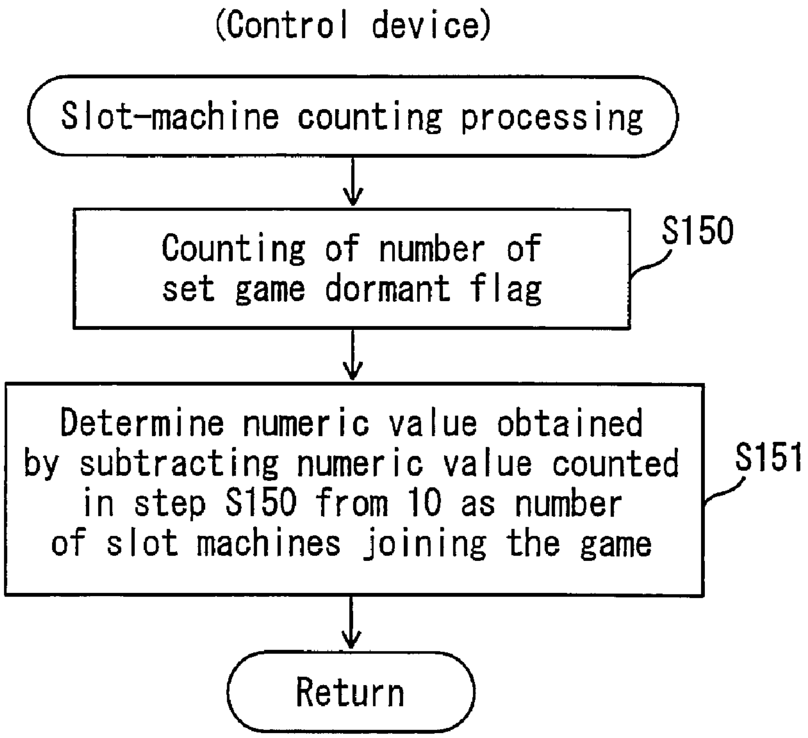
FIG. 10 is a flowchart illustrating a subroutine of slot-machine counting processing.

FIG. 10 is a flowchart illustrating a subroutine of slot-machine counting processing.

First, the CPU 201 counts a number of the set game dormant flag at a predetermined timing (step S150).

Here, the game dormant flag is described with reference to FIG. 11.

Figure 11:
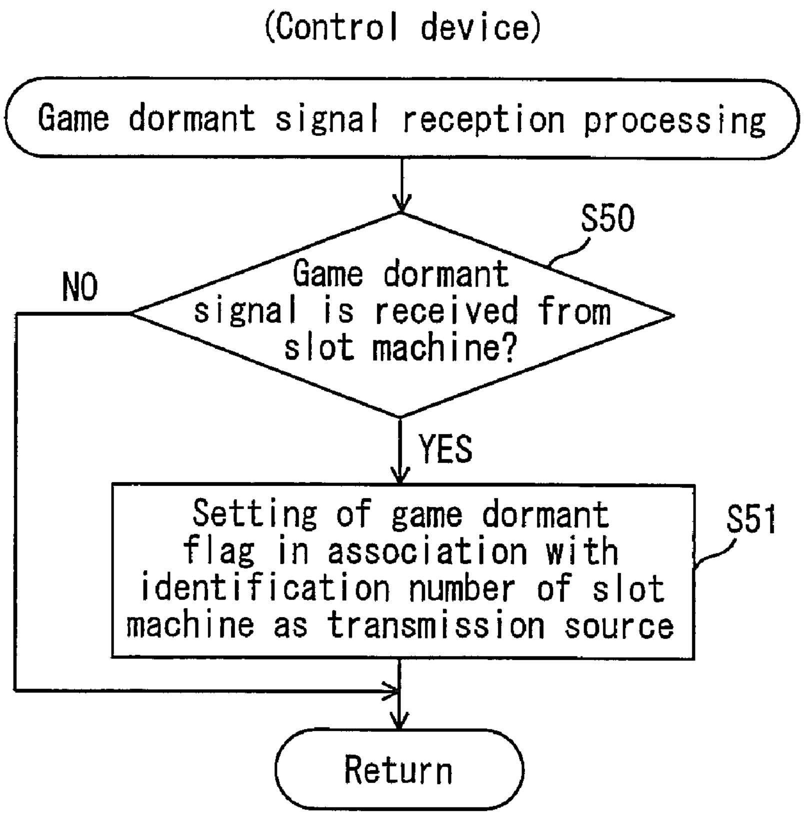
FIG. 11 is a flowchart illustrating a subroutine of game dormant signal reception processing.

FIG. 11 is a flowchart illustrating a subroutine of game dormant signal reception processing.

First, the CPU 201 determines whether or not to have received the game dormant signal (see step S11 in FIG. 6) at a predetermined timing from the slot machine 10 (step S50).

When determining not to have received the game dormant signal, the CPU 201 completes the present subroutine. On the other hand, when determining to have received the game dormant signal, the CPU 201 sets the dormant flag in association with the identification number of the slot machine 10 included in the received game dormant signal (step S51). Here, the CPU 201 clears the game dormant flag after a lapse of the predetermined time.

After executing the processing of step S150 in FIG. 10, the CPU 201 determines the numeric value obtained by subtracting the numeric value counted in step S150 from 10 as the number of slot machines joining the game (step S151).

As above, the slot-machine counting processing conducted in step S108 in FIG. 8 has been described with reference to FIG. 10 and FIG. 11, Subsequently, the CPU 201 executes winning-machine determination processing in step S109 in FIG. 8 (step S109).

The winning-machine determination processing is described with reference to FIG. 12.

Figure 12:
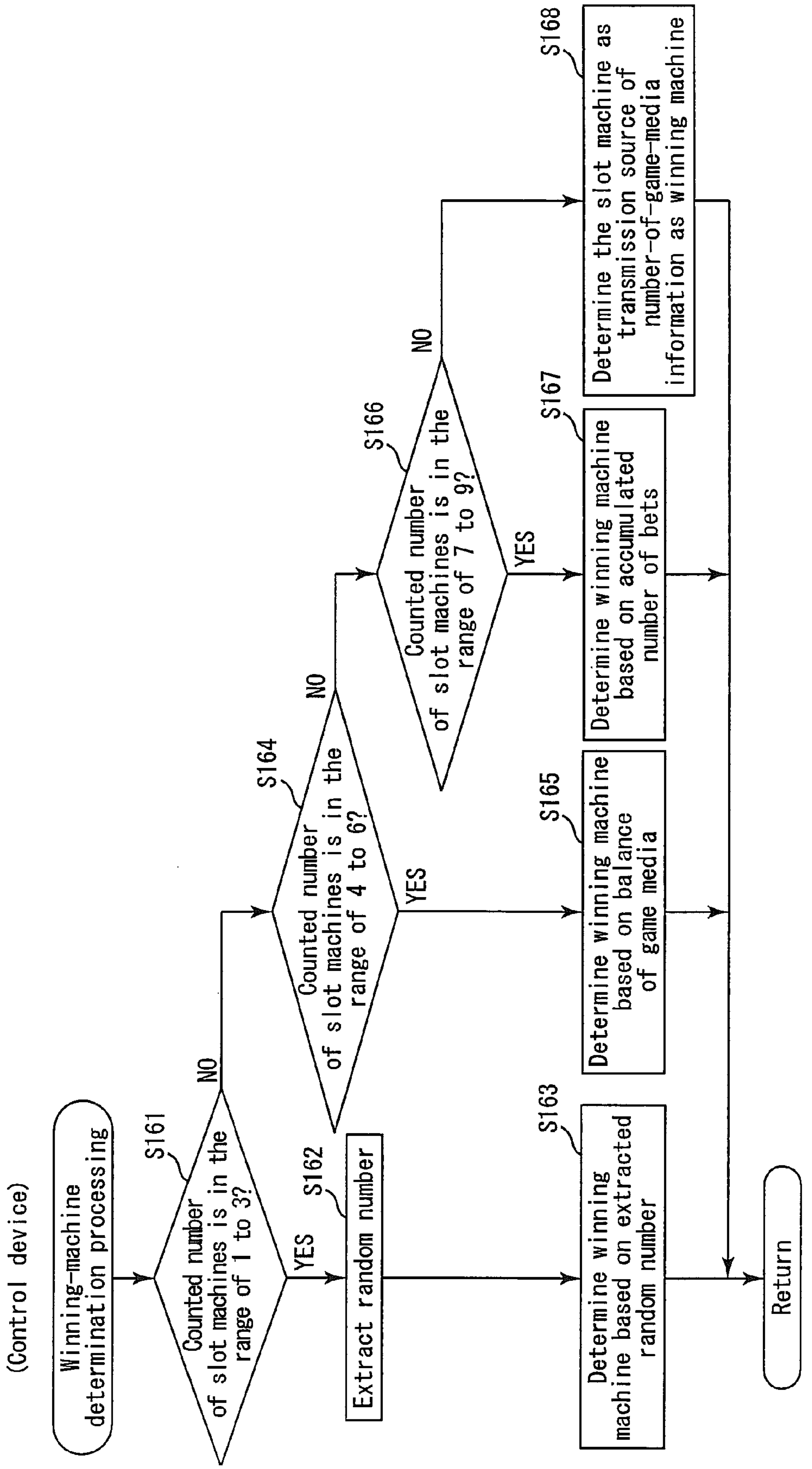
FIG. 12 is a flowchart illustrating a subroutine of winning-machine determination processing.

FIG. 12 is a flowchart illustrating a subroutine of winning-machine determination processing.

First, the CPU 201 determines whether or not the number of the slot machines 10 counted in step S108 is in the range of one to three (step S161).

When determining that the number of the slot machines 10 counted in step S108 is in the range of one to three, the CPU 201 extracts a random number generated by the random number generator 63 (step S162).

Then, the CPU 201 determines a single slot machine 10 out of 10 slot machines 10 based on the extracted random number. Then, the CPU 201 determines the determined slot machine 10 as a winning machine (step S163).

After executing the processing of step S163, the CPU 201 completes the present subroutine.

When determining in step S161 that the number of slot machines 10 counted in step S108 is not in the range of one to three, the CPU 201 determines whether or not the number is in the range of four to six (step S164).

When determining that the number of slot machines 10 counted in step S108 is in the range of four to six, the CPU 201 determines the slot machine 10 with the balance of the game media being the most negative value as the winning machine, based on the balance data stored in the balance storage area in the RAM 203 (step S165).

After executing the processing of step S165, the CPU 201 completes the present subroutine.

When determining in step S164 that the number of slot machines 10 counted in step S108 is not in the range of four to six, the CPU 201 determines whether or not the number is in the range of seven to nine (step S166).

When determining that the number of slot machines 10 counted in step S108 is in the range of seven to nine, the CPU 201 determines the slot machine 10 with the accumulated number of bets being the largest value as the winning machine, based on the accumulated number of bets stored in the accumulated-number-of-bets storage area in the RAM 203 (step S167).

After executing the processing of step S167, the CPU 201 completes the present subroutine.

When determining in step S166 that the number of slot machines 10 counted in step S108 is not in the range of seven to nine, the CPU 201 determines the slot machine 10 as a transmission source of the number-of-game-media information received in step S101 in FIG. 8 as the winning machine (step S168).

After executing the processing of step S168, the CPU 201 completes the present subroutine.

As above, the winning-machine determination processing conducted in step S109 in FIG. 8 has been described with reference to FIG. 12.

Subsequently, in step S110 in FIG. 8, the CPU 201 transmits the jackpot payout signal to the slot machine 10 determined as the winning machine in step S109 (step S110). Upon receipt of the jackpot payout signal, the jackpot payout processing is conducted in the slot machine 10 (see step S24 in FIG. 6).

When determining in step S107 that the cumulative value has not reached the predetermined value, or after executing the processing of step S110, the CPU 201 completes the present subroutine.

As above, the present embodiment has been described.

In the present embodiment, there has been described a case where the number of slot machines 10 joining the game is counted based on the transmission of the game dormant signal from the slot machine 10 to the control device 200 when the start button 23 has not been operated for the predetermined time. However, in the present invention, the method for counting the number of slot machines 10 joining the game is not limited to this case.

Figure 13:
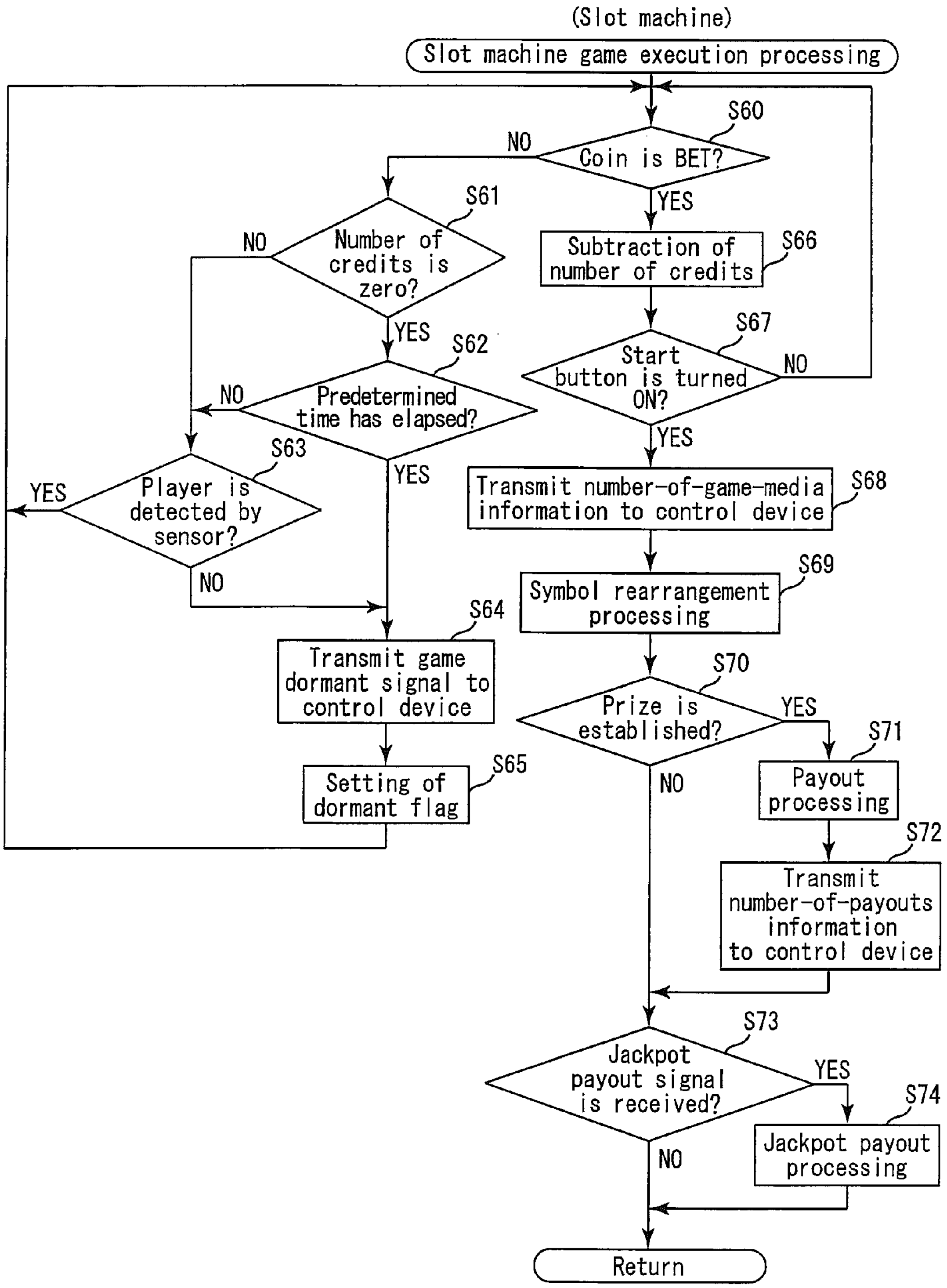
FIG. 13 is a flowchart illustrating a subroutine of slot machine game execution processing according to another embodiment.

FIG. 13 is a flowchart illustrating a subroutine of slot machine game execution processing according to another embodiment.

Processing of step S60 and steps S66 to S74 is virtually the same as the processing of steps S13 to S15 and steps S18 to S24 in FIG. 6, and therefore, only the processing of steps S61 to S65 is described here.

When determining in step S60 that the coin has not been betted, the main CPU 41 determines whether or not the number of credits stored in the RAM 43 is zero. When determining that the number of credits is not zero, the main CPU 41 shifts the processing to step S63. On the other hand, when determining that the number of credits is zero, the main CPU 41 shifts the processing to step S62.

In step S62, the main CPU 41 determines whether or not the time measured by the timer 61 has reached the predetermined time T. When determining that the time has not reached the predetermined time T, the main CPU 41 shifts the processing to step S63.

In step S63, the main CPU 41 determines whether or not to have detected the presence of the player by the proximity sensor 62. In the processing, the main CPU 41 determines whether or not to have received a detection signal indicative of the detection of the presence of the player from the proximity sensor 62. When determining to have detected the presence of the player by the proximity sensor 62, the main CPU 41 returns the processing to step S60.

When determining not to have detected the presence of the player in step S63 or when determining that the time has reached the predetermined time T in step S62, the main CPU 41 transmits the game dormant signal to the control device 200 (step S64). The game dormant signal includes the identification number of the slot machine 10. Further, the main CPU 41 sets the dormant flag (step S65) and returns the processing to step S60.

Here, the sensor is not limited to the proximity sensor, and it may be a weight sensor for detecting the weight, for example. In such a case, by setting the weight sensor on a chair provided for the gaming machine, the presence of the player may be detected by the weight sensor.

Further, in the present embodiment, there has been described a case where the slot machine 10 not joining the game may also be determined as the winning machine in the winning-machine determination processing illustrated in FIG. 12. However, in the present invention, the slot machine not joining the game may be set not to be determined as the winning machine.

For example, the following configuration may be adopted. Namely, after executing the processing of step S163, step S165, step S167, or step S168 in FIG. 12, the CPU 201 determines whether or not the game dormant flag is set in association with the identification number of the slot machine determined as the winning machine. When determining that the game dormant flag is not set, the CPU 201 completes the subroutine illustrated in FIG. 12. On the other hand, when determining that the game dormant flag is set, the CPU 201 again executes the processing of step S163, step S165, step S167, or step S168. At this time, the CPU 201 determines the winning machine excluding the slot machine in which the game dormant flag is set.

For example, in step S165, the CPU 201 determines the slot machine with the balance of the game media being the most negative value, among the slot machines in which the game dormant flag is not set, as the winning machine. Further, in step S167, the CPU 201 determines the slot machine with the accumulated number of bets being the largest value, among the slot machines in which the game dormant flag is not set, as the winning machine.

Further, in the present embodiment, there has been described a case where the number N of the LEDs 351 to be lighted is the maximum integral number N satisfying $N \leqq M \times b/B$ ("b" being the number of coins indicative of the number-of-game-media information, "B" being the number of coins corresponding to the predetermined value, and "M" being the total number of the LEDs 351 provided in the coupling illuminated line 310). Namely, the number of LEDs 351 lighted in each coupling illuminated line 310 corresponds to the cumulative value. However, in the present invention, the processing relating to lighting of the LED is not limited to this case. For example, in accordance with the number of gaming machines joining the game, the LEDs in number corresponding to the accumulated number of bets or the balance of the game media in each gaming machine may be lighted.

For example, the following configuration may be adopted. Namely, the control device executes the slot-machine counting processing illustrated in FIG. 10 at a predetermined timing (e.g. minutely). A memory device provided in the control device stores a table data indicating the correspondence relationship (see FIG. 2) between the number of slot machines joining the game and the determination method of the slot machine as a target of the payout of coins relating to the jackpot (winning-machine determination method). When the winning-machine determination method corresponding to the number counted in the slot-machine counting processing is a method for determining the winning machine based on the accumulated number of bets, the control device lights the LEDs in number determined based on the accumulated number of bets in each slot machine, among the LEDs included in the coupling illuminated line provided for each slot machine. Further, when the winning-machine determination method corresponding to the number counted in the slot-machine counting processing is a method for determining the winning machine based on the balance of the game media, the control device lights the LEDs in number determined based on the balance of the game media in each slot machine, among the LEDs included in the coupling illuminated line provided for each slot machine.

As above, according to the gaming system 1 of the present embodiment, the determination method of the slot machine 10 (winning machine) as a target of the payout of coins relating to the jackpot is different in accordance with the number of players joining the game. Accordingly, it is possible to have the player interested in the determination method. Further, it is also possible to have the player always become conscious of the number of players joining the game at the present. Consequently, it is possible to provide a game that the player hardly gets tired.

Further, according to the gaming system 1 of the present embodiment, the winning machine is determined based on the balance of the game media when the number of slot machines 10 joining the game is in the range of four to six, while the winning machine is determined based on the accumulated number of bets when the number of the slot machines 10 joining the game is in the range of seven to nine. Accordingly, there may be a case where the method for determining the winning machine based on the accumulated number of bets is advantageous for a player while the method for determining the winning machine based on the balance of the game media is disadvantageous for the player. Further, an opposite case may also be generated. Accordingly, it is possible to have the player always conscious of the present number of participants so as to know if the present number is advantageous or disadvantageous for the player in the relation with a situation of the game. As a result, it is possible to have the player absorbed in the game.

According to the gaming system 1 of the present embodiment, the gaming machine in which the bet triggering the cumulative value to reach the predetermined value has been betted is determined as the winning machine, when the number of the gaming machines joining the game is 10. Accordingly, it is possible to cause the player to have a sense of expectation for the cumulative value reaching the predetermined value every tune he or she places the bet, especially in a case where the cumulative value is approaching the predetermined value. Consequently, it becomes possible to cause the player to have a stronger enthusiasm for each bet, thereby having the player absorbed in the game. Further, it is possible to give a great joy to the player in a case where the bet placed by the player causes the cumulative value to reach the predetermined value.

In the above described embodiment, there has been described a case where the correspondence relationship between the rearranged symbol and the number of coin-outs is set as illustrated in FIG. 7. However, in the present invention, the correspondence relationship between the symbol and the number of coin-outs is not limited to this example.

In the following, the correspondence relationship between the symbol and the number of coin-outs in another embodiment is described with reference to FIGS. 14A to 14C and FIGS. 15A to 15D.

It is to be noted that, in the following description, the constituent elements as same as those of the gaming system 1 according to the aforementioned embodiment will be provided with the same numerals.

Further, the description will be omitted with regard to a part in the following embodiment to which the description of the aforementioned embodiment is applicable.

FIGS. 14A to 14C are views each illustrating a relationship between a combination of symbols rearranged on a winning line and a number of coin-outs in another embodiment.

FIGS. 15A to 15D are views each illustrating exemplary symbols rearranged in display blocks in another embodiment.

As illustrated in FIGS. 15A to 15D, nine symbols in total can be rearranged in three rows and three columns, in display blocks 328 according to the present embodiment. A winning line WL is set on the center row. When the symbols in a predetermined combination are rearranged on the winning line WL, a payout of coins is conducted.

In the present embodiment, the maximum number of coins which can be betted on a single game is three.

As illustrated in FIGS. 14A to 14C, in the present embodiment, the relationship between the combination of symbols and the number of coin-outs is set to be different in a case where the number of betted coins is 1, in a case where the number of betted coins is 2, and in a case where the number of betted coins is 3.

Figure 15A:
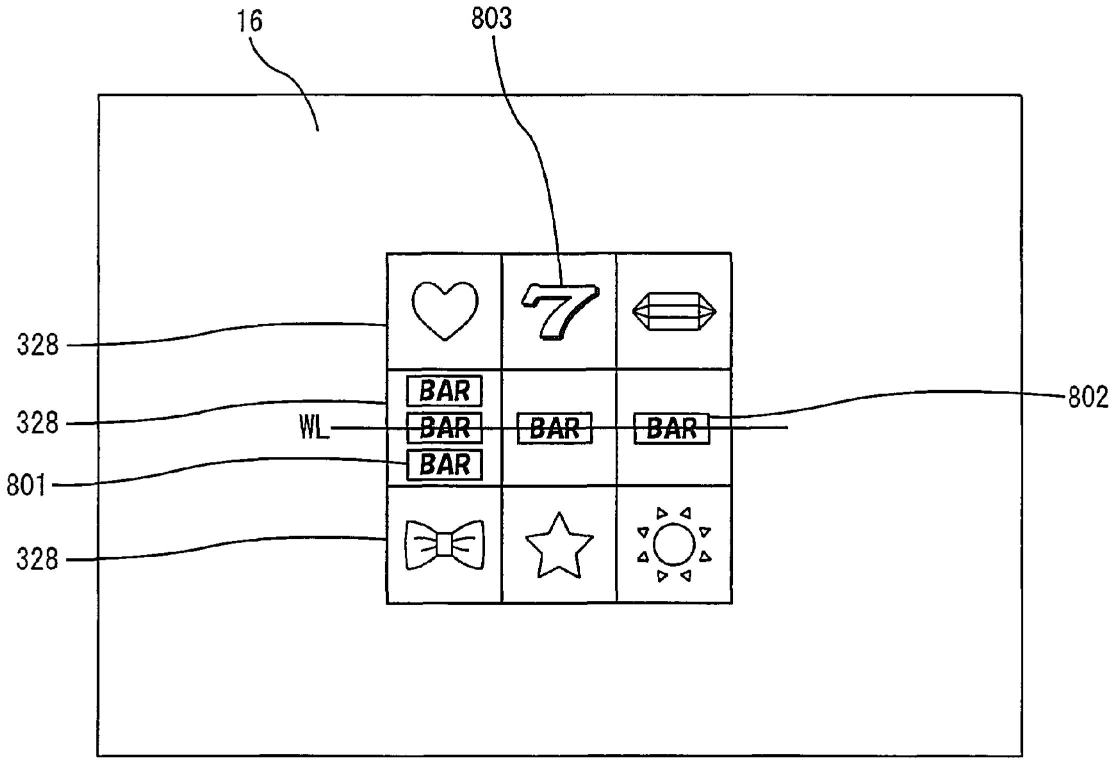
FIG. 15A is a view illustrating exemplary symbols rearranged in display blocks in another embodiment.
Figure 15B:
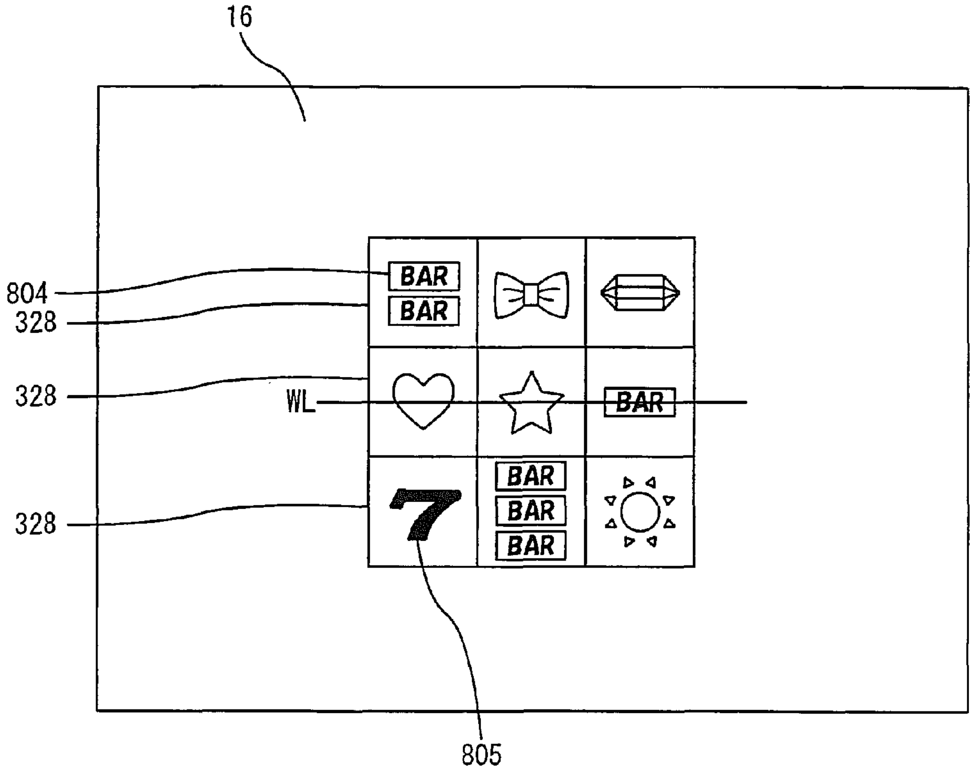
FIG. 15B is a view illustrating exemplary symbols rearranged in display blocks in another embodiment.

In the figure, "3bar" is a symbol 801 illustrated in FIG. 15A, "2bar" is a symbol 804 illustrated in FIG. 15B, and "1bar" is a symbol 802 illustrated in FIG. 15A. Further, "anybar" is any of "3bar", "2bar" and "1bar".

Figure 15C:
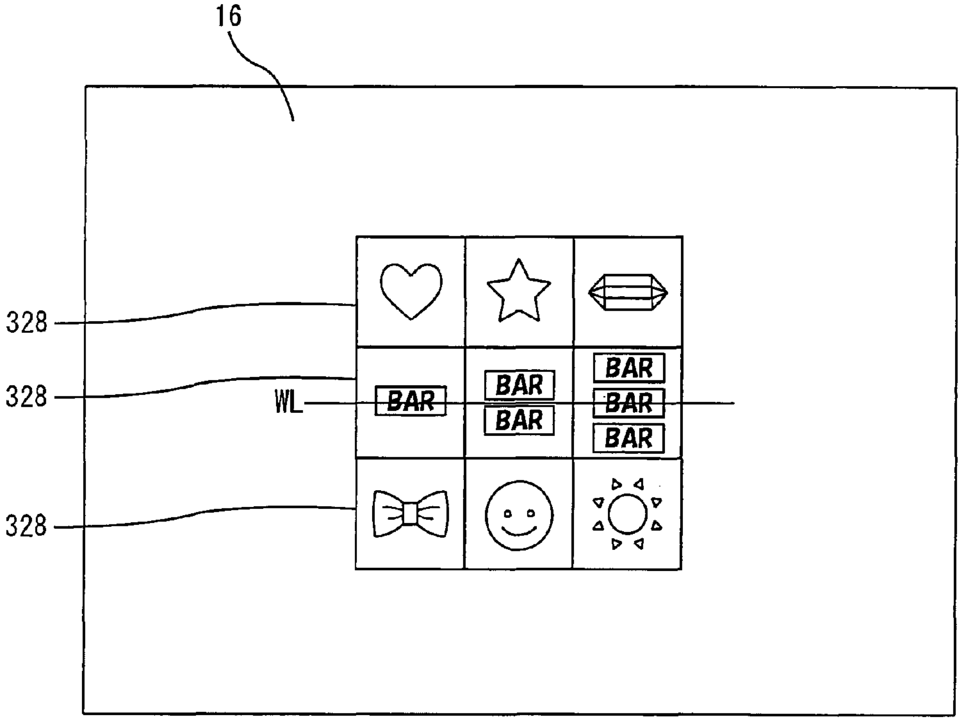
FIG. 15C is a view illustrating exemplary symbols rearranged in display blocks in another embodiment.
Figure 15D:
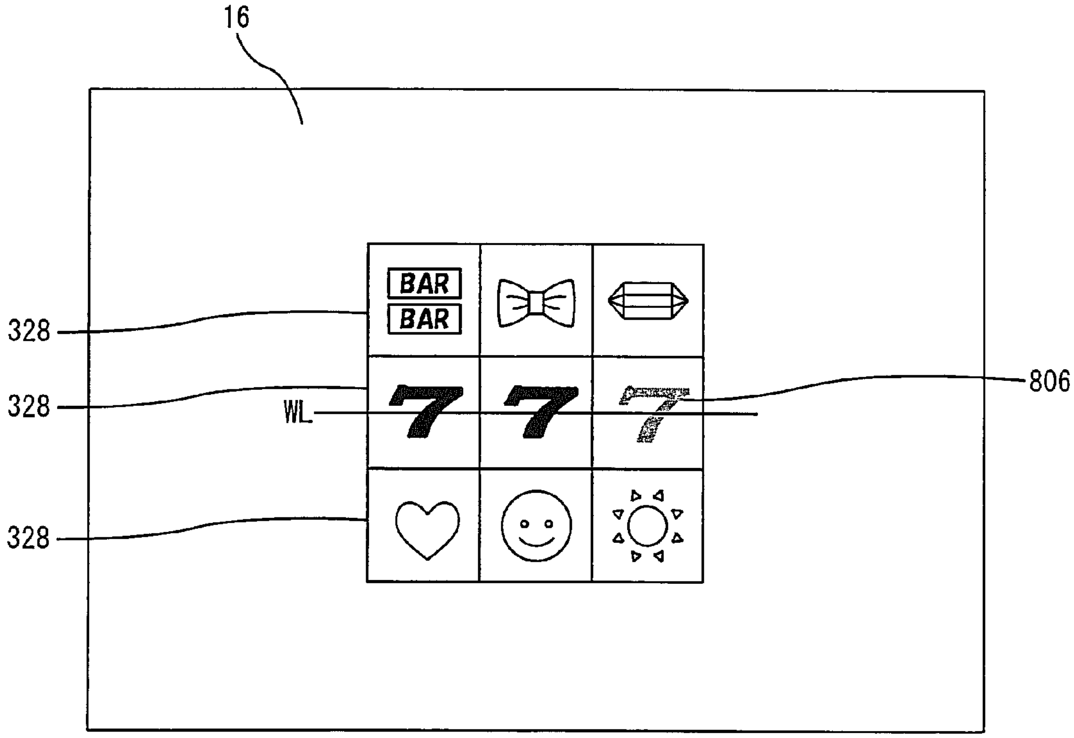
FIG. 15D is a view illustrating exemplary symbols rearranged in display blocks in another embodiment.

Further, "blue7" is a symbol 806 illustrated in FIG. 15D, "red7" is a symbol 805 illustrated in FIG. 15B and "white7" is a symbol 803 illustrated in FIG. 15A.

Furthermore, in the present embodiment, 8 types of symbols including "RIBBON", "HEART", "STAR", "MOON", "SUN", "JEWEL", "CROWN", and "SMILE" may be also rearranged, in addition to "3bar", "2bar", "1bar", "blue7", "red7", and "white7".

Moreover, the RAM 43 stores data indicative of the relationship between the combination of symbols and the number of coin-outs.

In the present embodiment, the main CPU 41 executes the following processing of step S20 in FIG. 6, since the present embodiment is different from the aforementioned embodiment in the above described respects.

Namely, the main CPU 41 determines that a prize has been established, in a case where at least one combination of symbols is established on the winning line WL, out of "3bar×3", "2bar×3", "1bar×3", "anybar×3", "blue7×3", "red7×3", "white7×3", "RIBBON×3", "HEART×3", "STAR×3", "MOON×3", "SUN×3", "JEWEL×3", "CROWN×3", and "SMILE×3".

In step S21, the main CPU 41 pays out coins in number determined based on the data indicative of a relationship between the combination of symbols and the number of coin-outs (see FIGS. 14A to 14C).

For example, in the game on which a single coin has been betted, when a symbol combination of "3bar-1bar-1bar" is established on the winning line WL as illustrated in FIG. 15A, ten coins will be paid out, since this combination corresponds to "anybar-anybar-anybar".

As illustrated in FIG. 15B, when just one symbol of "1bar" is rearranged on the winning line WL, a coin is not paid out.

In the game in which two coins are betted, when symbols in a combination of "1bar-2bar-3bar" are rearranged on the winning line WL as illustrated in FIG. 15C, 20 coins are paid out since the combination of the symbols corresponds to "anybar-anybar-anybar".

In the game in which three coins are betted, when symbols in a combination of "red7-red7-blue7" are rearranged on the winning line WL as illustrated in FIG. 15D, the combination of symbols does not establish a prize and coins are not paid out, since both red and blue are present in colors of the figure of "7".

Although the embodiments of the present invention were described above, they were just illustrations of specific examples, and hence do not particularly restrict the present invention. A specific configuration of each step and the like is appropriately changeable in terms of design. Further, the effects described in the embodiments of the present invention are just recitations of the most suitable effects generated from the present invention. The effects of the present invention are thus not limited to those described in the embodiments of the present invention.

Further, the foregoing detailed descriptions centered the characteristic parts of the present invention in order to facilitate understanding of the present invention. The present invention is not limited to the embodiments in the foregoing specific descriptions but applicable to other embodiments with a variety of application ranges. Further, terms and phrases in the present specification were used not for restricting interpretation of the present invention but for precisely describing the present invention. It is considered easy for the skilled in the art to conceive other configurations, systems, methods and the like included in the concept of the present invention from the concept of the invention described in the specification. Therefore, it should be considered that recitations of the claims include uniform configurations in a range not departing from the range of technical principles of the present invention. Moreover, an object of the abstract is to enable a patent office, a general public institution, an engineer belonging to the technical field who is unfamiliar with patent, technical jargon or legal jargon, and the like, to smoothly determine technical contents and an essence of the present application with simple investigation. Accordingly, the abstract is not intended to restrict the scope of the invention which should be evaluated by recitations of the claims. Furthermore, for thorough understanding of an object of the present invention and an effect specific to the present invention, it is desired to make interpretation in full consideration of documents already disclosed and the like.

The foregoing detailed descriptions include processing executed on a computer or a computer network. Explanations and expressions above are described with the aim of being most efficiently understood by the skilled person in the art. In the specification, each step for use in deriving one result should be understood as the self-consistent processing. Further, in each step, transmission/reception, recording or the like of an electrical or magnetic signal is performed. While such a signal is expressed by using a bit, a value, a symbol, a letter, a term, a number or the like in processing of each step, it should be noted that those are used simply for the sake of convenience in description. While there are cases where processing in each step may be described using an expression in common with that of action of a human, processing described in the specification is essentially executed by a variety of devices. Further, another configuration requested for performing each step should become apparent from the above descriptions.

What is claimed as new and desired to be secured by Letters Patent of the United States is:

1. A gaming system comprising:

a plurality of gaming machines each including a controller;

a control device including a memory device and a processor;

a network enabling communication between said plurality of gaming machines and said control device;

wherein said memory device is capable of storing a plurality of types of winning-machine determination programs for determining the gaming machine to which payout of a game medium is conducted, out of said plurality of gaming machines, said winning-machine determination programs respectively determining the gaming machine by methods different from each other, said controller is programmed to execute processing of (a) accepting a bet of a game medium, and (b) transmitting number-of-game-media information indicative of a number of betted game media as the bet accepted in said processing (a) to said control device, said processor is programmed to execute processing of (A) cumulatively counting a part of the number of betted game media as a cumulative value based on said number-of-game-media information received from said gaming machine, and (B) counting a number of the gaming machines joining the game among the gaming machines connected by said network, when said cumulative value has reached a predetermined value, (C) determining the gaming machine to which the payout of the game medium is conducted, by reading the winning-machine determination program of the type specified based on the number of the gaming machines counted in said processing (B) from said memory device and executing the winning-machine determination program, and (D) paying out a predetermined number of game media to the gaming machine determined in said processing (C).

2. The gaming system according to claim 1, wherein said plurality of types of the winning-machine determination program includes a special winning-machine determination program for determining the gaming machine to which the payout of the game medium is conducted, based on said number-of-game-media information, and said processing (C) includes processing of determining the gaming machine to which the payout of the game medium is conducted, based on said number-of-game-media information transmitted in said processing (b), by reading said special winning-machine determination program from said memory device and executing said special winning-machine determination program, when the number of gaming machines counted in said processing (B) satisfies a predetermined condition.

3. The gaming system according to claim 2, wherein said special winning-machine determination program includes a particular program for determining the gaming machine as a transmission source of the number-of-game-media information having triggered said cumulative value to reach the predetermined value in the count as the gaming machine to which the payout of the game medium is conducted, and said processing (C) includes processing of determining the gaming machine as a transmission source of the number-of-game-media information having triggered said cumulative value to reach the predetermined value in the count among the counts in said processing (A), by reading said particular program from said memory device and executing said particular program, when the number of the gaming machines counted in said processing (B) satisfies a specific condition.

4. A game control method comprising steps of:

(a) accepting a bet of a game medium in a gaming machine, (b) transmitting number-of-game-media information indicative of a number of betted game media as the bet accepted in said step (a) to a control device from said gaming machine, (A) cumulatively counting in said control device a part of the number of betted game media as a cumulative value based on said number-of-game-media information received from said gaming machine, and (B) counting in said control device a number of the gaming machines joining the game among the gaming machines connected by a network enabling communication between a plurality of said gaming machines and said control device, when said cumulative value has reached a predetermined value, (C) determining in said control device the gaming machine to which payout of the game medium is conducted, by reading a winning-machine determination program of a type specified based on the number of the gaming machines counted in said step (B) out of a plurality of types of the winning-machine determination programs for determining the gaming machines, to which the payout of the game medium is conducted, out of the plurality of said gaming machines from the memory device and executing the winning-machine determination program, and (D) paying out a predetermined number of game media to the gaming machine determined in said step (C).

* * * * *